(12) United States Patent
Milliron et al.

(10) Patent No.: US 6,208,670 B1
(45) Date of Patent: Mar. 27, 2001

(54) DIGITAL CARRIER SYSTEM FOR RURAL TELEPHONE AND DATA APPLICATIONS

(75) Inventors: David B. Milliron, Woodstock; John M. Kilgore, Cumming; Dean C. Poirier, Duluth, all of GA (US)

(73) Assignee: Conklin Corporation, Norcross, GA (US)

( * ) Notice: Subject to any disclaimer, the term of this patent is extended or adjusted under 35 U.S.C. 154(b) by 0 days.

(21) Appl. No.: 09/036,499

(22) Filed: Mar. 6, 1998

Related U.S. Application Data

(60) Provisional application No. 60/040,382, filed on Mar. 10, 1997.

(51) Int. Cl.[7] .................................................. H04J 3/04
(52) U.S. Cl. ........................................... 370/540; 370/542
(58) Field of Search .................................... 370/535, 540, 370/541, 542, 470, 472

(56) References Cited

U.S. PATENT DOCUMENTS

| | | | |
|---|---|---|---|
| 3,904,833 | 9/1975 | Beene et al. ............................. | 179/84 |
| 3,941,941 | 3/1976 | Simokat et al. ........................ | 179/84 |
| 4,027,224 | 5/1977 | Beene ....................................... | 321/2 |
| 4,081,609 | 3/1978 | Beene et al. ........................... | 179/2.5 |
| 4,087,639 | 5/1978 | Beene et al. ........................... | 179/2.5 |
| 4,309,676 | 1/1982 | Martin et al. ........................... | 333/14 |
| 4,343,971 | 8/1982 | Beene .................................... | 179/70 |
| 4,393,492 | 7/1983 | Bishop .................................... | 370/15 |
| 5,289,359 | * 2/1994 | Ziermann ............................... | 363/21 |

OTHER PUBLICATIONS

"82A Station Carrier System", GTE Practices Engineering–Plant Series, GTE Lenkurt, Section 342–821–101, Issue 2, Jun. 1978.

"PG–Flex", PairGain Technologies, Supercom '96, Dallas, Texas, Jun. 23–27, 1996.

"CM–8® Station Carrier System Description and Application", Reliance Telecommunication Electronics Company, Section 300–140–150, Issue 2, Jan. 1981.

* cited by examiner

Primary Examiner—Joseph L. Felber
(74) Attorney, Agent, or Firm—King & Spalding

(57) ABSTRACT

A digital carrier telephony system for delivering voice and data telephony services to subscribers in rural locations having low population densities. A Central Office processes telephony signals having subscriber channels. A Terminal (COT), which is connected to the CO and to one end of a digital carrier line, can transmit outgoing digital carrier line signals on the digital carrier line in response to multiplexing the subscriber channels of telephony signals received on a wired link from the CO. The COT also can transmit telephony signals to the CO in response to demultiplexing subscriber channels of incoming digital carrier line signals received on the digital carrier line. At subscriber locations, multiple remote drop units are typically connected to the digital carrier line. The remote drop unit can insert one of the subscriber channels into the multiplexed subscriber channels of one of the incoming digital carrier line signals. In addition, the remote drop unit can retrieve one of the subscriber channels from the multiplexed subscriber channels of one of the outgoing digital carrier line signals. The remote drop unit also can pass those incoming and outgoing carrier line signals carried on the digital carrier line not intended for communication to the subscribers associated with that unit. Each remote drop unit can be powered in the field by coupling span power generated by the COT and carried on the digital carrier line.

28 Claims, 14 Drawing Sheets

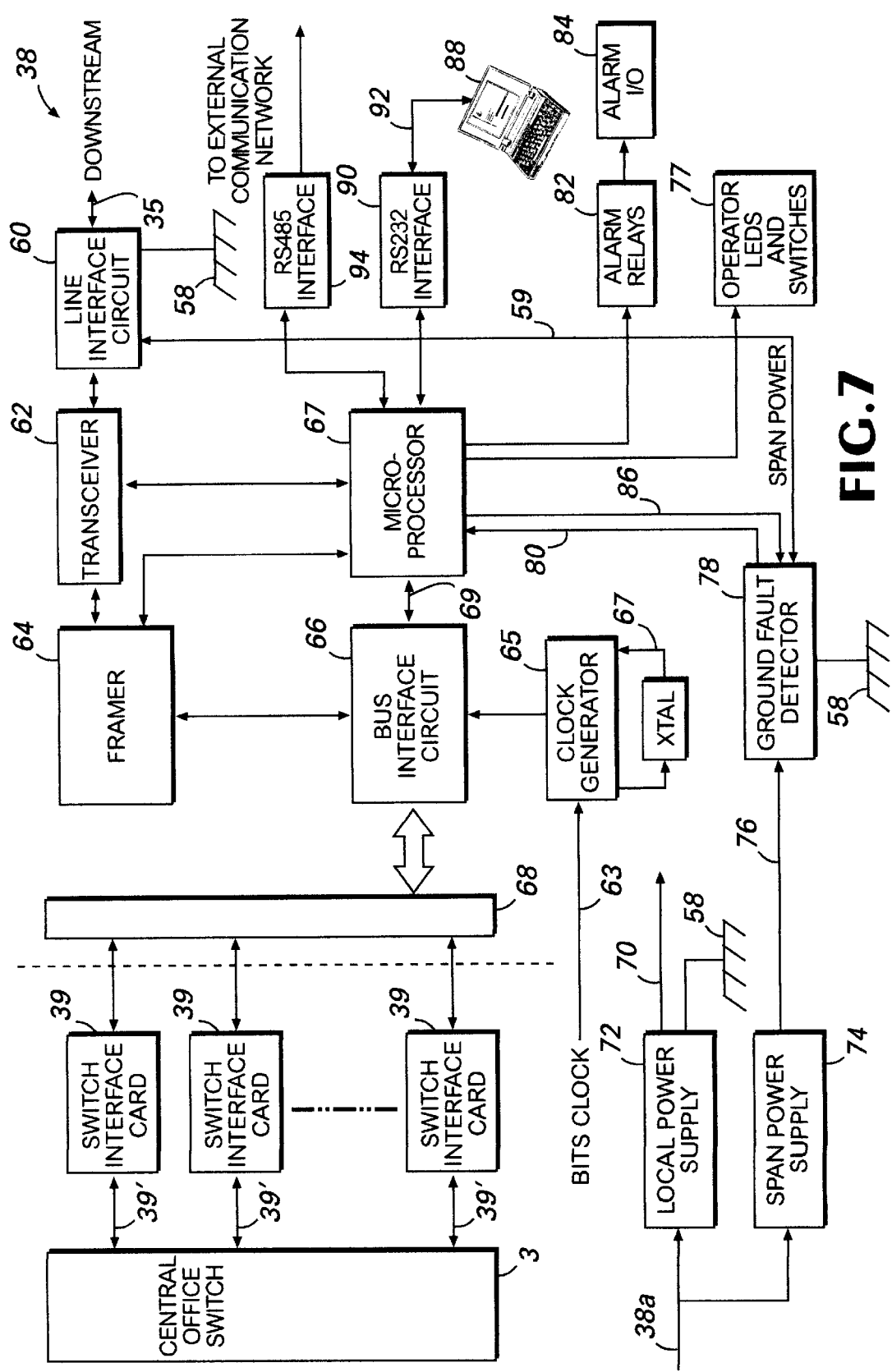

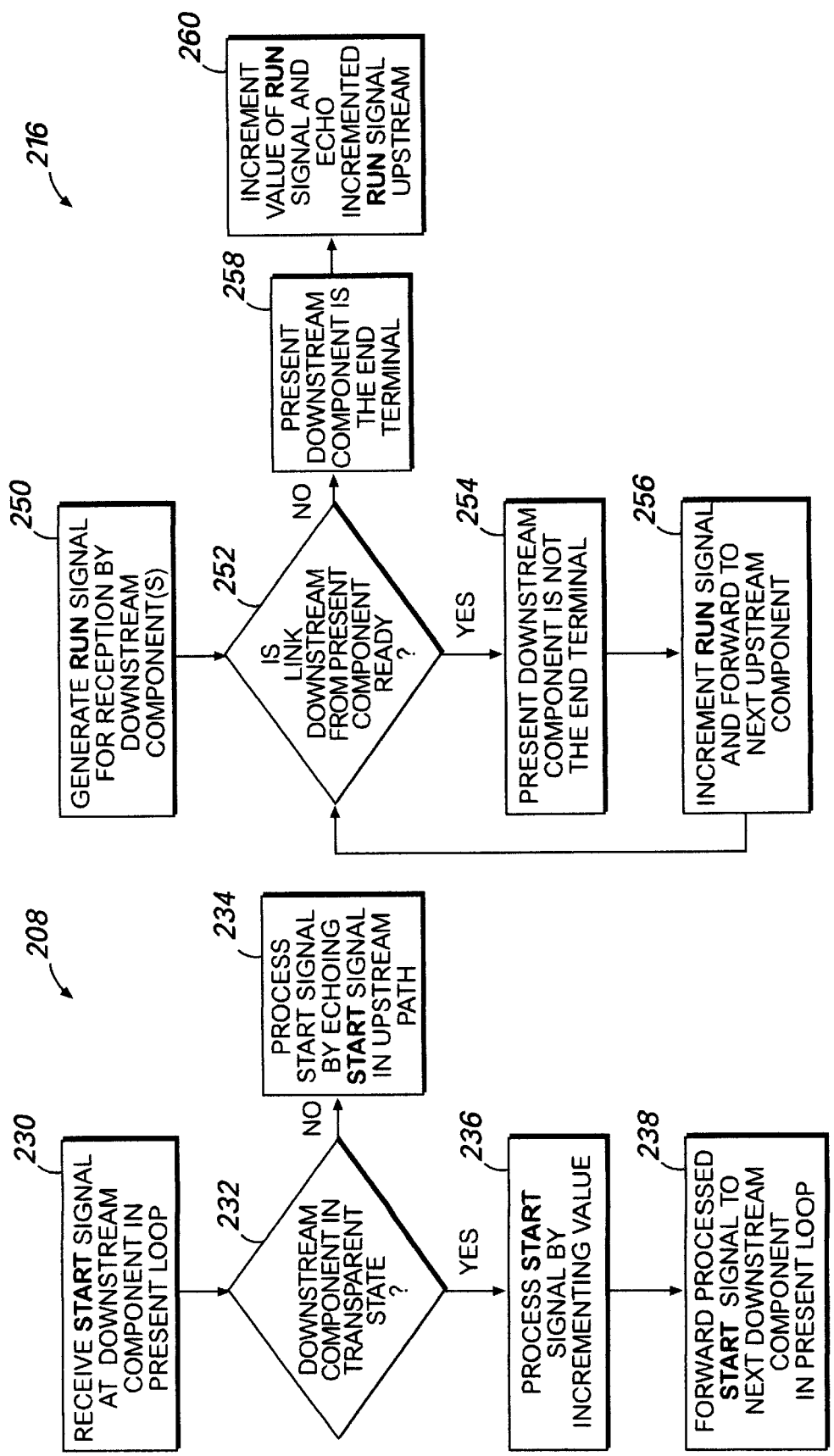

DIGITAL CARRIER SYSTEM FOR RURAL TELEPHONE AND DATA APPLICATIONS

CROSS REFERENCE TO RELATED APPLICATION

This application claims priority to U.S. Provisional Application No. 60/040,382 filed Mar. 10, 1997.

TECHNICAL FIELD

The present invention is related generally to a digital carrier telephony system and, more particularly described, is directed to a digital carrier system for supporting the delivery of telephony and data services to a limited set of subscribers in remote locations, such as rural regions.

BACKGROUND OF THE INVENTION

Local telephone companies have used many different systems to provide Plain Old Telephone System (POTS) services to subscribers in rural areas. For a selected POTS application, a particular system may be implemented because it can overcome the limitations or problems that are commonly associated with rural telephone service delivery. Typical problems associated with the delivery of telephony and data services to a small number of subscribers in a rural location include a shortage of available copper wire pairs for carrying signals, an extended distance between the Central Office (CO) and the subscriber, a lack of available electrical power to operate components of the telephony system, and certain communication technology limitations. Representative systems for addressing at least some of these problems include an analog "direct connection" system, an analog carrier system, a universal digital loop carrier (UDLC) system, an integrated digital loop carrier (IDLC) system, and an add-drop multiplexing system. These prior telephony systems will be described in more detail below in connection with FIGS. 1, 2, 3 and 4.

Direct Connection System

FIG. 1 illustrates an analog direct connection system 1 for connecting a subscriber's telephone 5 to a CO switch 3 via a local loop 2 comprising copper wire pairs. This direct connection system can be implemented for a rural application unless the existing set of copper wire pairs for carrying telephony signals is smaller than the numbers of subscribers to the telephony service. In the event that the local loop 2 extends for a distance greater than approximately 40 kft., the CO switch 3 is typically equipped with battery voltages in excess of the nominal –48Vdc, and amplifiers 4 can be used within the local loop 2 to increase the level of the telephony signal. The direct connection system is not appropriate for applications involving a distance between the CO switch and the subscriber's telephone that is outside the limits of switch capability.

In contrast to the direct connection system described above, multiplex systems can be used to transport two or more telephone conversations or data links between a subscriber's premises and a telephone terminal or CO switch. As described below in connection with FIGS. 2, 3 and 4, prior multiplexing systems have used a variety of transmission techniques and multiplexing and encoding schemes, and delivered a variety of telephony services.

Amplitude Modulated Telephone Carrier System

U.S. Pat. No. 4,087,639 describes a representative amplitude modulated telephone carrier system that supports the delivery of POTS for both single and multiple party lines over a single pair of copper wires. The system, which is powered from the CO, modulates an analog speech signal onto a single carrier in the very low frequency (VLF) or low frequency (LF) bands to complete a telephony transmission. Subscriber terminals can be placed at any location along the telephone line by using a bridged tap connection. Carrier signals can be regenerated at prescribed intervals along the telephone line by using bidirectional amplifiers.

Referring now to FIG. 2, which illustrates a typical amplitude modulated telephone carrier system 6, a multi-band analog double sideband modulated carrier is carried on a single pair line 7. Subscriber drops 8 can be placed at any location along the line 7 between a Central Office Terminal (COT) 10 and a termination network 11. The subscriber's telephone 5 is connected to one of the subscriber drops 8 via a wire pair 9. Each subscriber drop 8 is powered from the line 7 and is connected to that line by a bridged tap splice in a conventional "T" connection. A bidirectional repeater 12 can be inserted along the line 7 to amplify the carrier signals on an as needed basis. The COT 10 is located at the CO 3 and is typically powered by a local –48V dc source via an interface cable 13. The COT 10 can house plug-in cards 18 for converting the analog carrier on the line 7 to a conventional 2-wire POTS signal for distribution to the CO 3 via an interface 19.

For a typical amplitude modulated telephone carrier system, the maximum distance between the CO switch and a subscriber's telephone can exceed 100 kft. In contrast, the distance between subscriber drops and the subscriber premise associated bridge-tap connections is commonly two or three kft. However, the distance 'd' between any two bridge tap connections, as shown in FIG. 2, can range from 0 feet to approximately 50 kft.

The amplitude modulated telephone carrier system can support limited data services, but cannot deliver these services by means other than low speed (nominally 4800 bps) analog modems. Furthermore, this analog-type carrier system cannot support the delivery of CLASS features, such as caller identification, call forwarding and call waiting, to subscribers. This effectively limits the growth of possible services that can be offered by a telephone company that relies on this analog transmission system. The limited data services and the absence of CLASS functions are a direct result of the analog component implementation of the amplitude modulated telephone carrier system. In addition, the telephone company must maintain the signal characteristics of an amplitude modulated telephone carrier system, including impedance levels, current levels, and voltage levels, because of the analog implementation of this system. For example, this system requires a terminating impedance at the end of the subscriber loop.

Universal Digital Loop Carrier System

A typical universal digital loop carrier system, also described as a UDLC system, uses a digital multiplexer, placed between the subscriber's telephone and the CO, to combine subscriber channels into a single high speed digital line signal for transmission to a de-multiplexer or a COT. Because a multiplexed digital line cannot carry signals as far as a corresponding analog line, the digital line often requires a number of digital repeaters to boost signal level. A typical digital multiplex system will carry from 24 to 3000 POTS circuits.

FIG. 3 illustrates the components of a typical UDLC system 16, which represents a point-to-point multiplex system. A remote terminal (RT) 17, connected to voice and data channels, places voice and data signals in a digital format and time-division multiplexes these digital signals onto a single digital carrier for transmission. The digital carrier is transmitted by a carrier line 18 extending between the RT 17 and a COT 19. One or more bidirectional repeaters 20 can be placed in the line 18 to boost the level of the digital carrier. The line 18 is terminated at the COT 19, which performs the inverse function of the RT 17. In particular, the COT 19 maps individual channels on a one-for-one basis and reproduces the channels in original form. Channel grooming and interchange, however, are not performed by the COT 19. The number of channels supported by the RT 17 is the same as that of the corresponding COT 19.

The customer premises equipment (CPE) 5 is connected to a POTS line card 21 in the RT 17 via a copper local loop 22 having a length of typically less than 12 kft. The RT 17 is typically powered by a local AC source via an interface cable 23a. A channel card 24 of the COT 19 is connected to the CO 3 via a copper pair 25. The COT 19 is typically powered from a local −48Vdc power supply, typically located at the CO 3, via an interface cable 19a.

Integrated Digital Loop Carrier System

Although IDLC systems have evolved from the UDLC system design shown in FIG. 3, IDLC systems typically possess a higher level of control over the voice or data channels. In contrast to UDLC systems, IDLC systems typically can assign channels to time slots (DS-0s), concentrate lines into fewer trunks, and reformat dialing and other signaling information. A significant difference between the UDLC and the IDLC systems is the elimination of the COT in the IDLC system. In particular, the line carrying digital signals is directly connected to the CO switch via an appropriate interface for carrying a multiplexed stream of digitized voice signals.

A fundamental limitation of both the UDLC system and the IDLC system is the use of a remote terminal powered by local AC power source rather than by power generated at the CO (or COT) and carried to remote components via the carrier line. In addition, these prior systems rely upon a single RT to distribute telephony signals to subscribers. This signal distribution implementation limits the use of the UDLC and IDLC systems to a single location having a relatively large concentration of subscribers, wherein spacing between these subscribers is limited. Consequently, UDLC and IDLC systems are typically installed in a multiple-home subdivision or business park representing a concentrated subscriber base.

Add-Drop Multiplexer System

An add/drop multiplexer system 30, which is shown in FIG. 4, uses remote terminals on an optical fiber ring to transport signals between a CO and subscribers. Remote add/drop terminals (ADT) 26A–26C are connected to each other and to the COT 27 via one or two fiber optic cables 28. Because ADTs can be located in either a telephone company-owned cabinet or in a subscriber's premises, a power interface cable can be connected to either a local power source, typically 120 Vac or −48 Vdc, to power each ADT 26. The add/drop multiplexer system also uses a COT 27 with capabilities similar to that of the UDLC system illustrated in FIG. 3. A significant difference, however, is the use of a pair of optical interfaces rather than a single electrical interface, such as copper wire pairs, for connecting signals between the ADTs 26 and the COT 27. For example, two optical fiber cables 28 are connected between the COT 27 and the ADTs 26. The fiber optic cables 28 operate in a simplex mode where one cable is used for transmit operations and the remaining cable is used for receive operations. In this way, signal traffic rotates around the fiber ring formed by the four segments of the fibers 28 in either a clockwise or counter-clockwise direction. Telephone hand sets 5a and 5b are respectively connected to an ADT 26A and an ADT 26B via line cards 26' and a copper pair 28'.

To complete a call from the telephone 5a, the ADT 26A multiplexes a DS-0 signal into a digital stream and sends the digital data via the transmit fiber to the ADT 26B, where the data stream is selectively demultiplexed and traffic destined for that terminal is delivered to appropriate subscribers. The DS-0 traffic from the telephone 5a remains in the digital stream and is transmitted to an ADT 26C, where similar demultiplexing occurs. The DS-0 traffic from the telephone 5a again remains in the multiplexed stream and is transmitted to the COT 27. At the COT 27, the DS-0 traffic from the telephone finally demultiplexed and sent to the CO 3 via a copper pair 29 and an interface card 27b. Similarly, traffic from the CO 3 is routed to the telephone 5a and to other subscribers via the ADTs 26A, 26B, and 26C. The advantages of the add/drop multiplexer architecture are that time slots can be reused within a ring and that traffic can be sent between ADTs 26. For example, the telephone 5a can be connected to the telephone 5b without traffic passing through the CO 3, thereby conserving system bandwidth.

Although the prior telephony systems described above have addressed certain problems faced by telephony subscribers, these systems do not solve the problem of providing combined voice and data telephony services for rural telephony subscribers by communicating a digital carrier signal over an existing single wire pair cable. A typical rural telephony application is directed to a population density of less than 100 persons per square mile, wherein the subscribers are typically served by telephone loops comprising copper wire pairs extending up to 50 kft. Prior systems are not easily adaptable to support the addition of new subscribers in rural areas, particularly those rural locations having service needs increasing at a rate of five to ten percent per year. Many existing rural telephone installations have fewer copper wire pairs than the number of existing telephony subscribers, thereby limiting the amount of subscriber growth that can occur for any particular rural location. Although a basic solution to the limited installation of wire pairs is simply to install new copper cables from the CO to the subscribers, this solution is both time consuming and expensive for telephone companies because the cost of obtaining and laying cable alone can far outweigh the cost of the supporting electronics installation.

In view of the foregoing, there is a need for an alternative telephony system to service the communications needs of subscribers in rural locations. In particular, there is a need for a telephony system that can utilize an existing copper wire pair installation to carry digital telephony signals while replacing electronic components to provide a level of telephony services presently available only in urban locations. This replacement system should provide subscribers with a higher level of POTS services, while allowing telephone companies to offer advanced voice and data services and to increase the reliability of the overall telephone network. The replacement solution is preferably a digital implementation for carrying voice and data signals throughout the local loop extending between the CO and the subscriber's telephone. A digital implementation can provide superior transmission performance when compared to its analog counterpart because the digital implementation can support an increased quality of telephony service by limiting analog noise and cross-talk signals. The present invention addresses the above-described issues by providing a replacement-type telephony system for rural applications based on a digital carrier system architecture for communicating digital carrier signals on a single wire pair cable.

SUMMARY OF THE INVENTION

The present invention is directed to a distributed digital carrier telephony system that solves the problem of upgrading telephony voice and data services for rural locations having limited copper wire pair installations. This inventive replacement solution is based on a digital architecture employing remote drop units on a digital carrier line for distributing telephony voice and data signals between the Central Office (CO) and each subscriber's telephone. The digital carrier telephony system can support the delivery of these telephony signals as multiple subscriber channels, typically DS-0 channels, on a single wire pair cable, typically a copper wire pair, forming the digital carrier line to remote drop units associated with service subscribers. This implementation allows telephone companies to offer rural subscribers the types of telephony services at present available only in urban markets, including Custom Local Area Signaling Service (CLASS), such as call forwarding and caller identification functions, and high speed data communication. Advantageously, each remote drop unit of the digital carrier telephony system can be powered by electrical power originating at the CO location, rather than a source local to the remote drop unit, and transported over the digital carrier line in the form of span power.

Generally described, the digital telephony system includes a CO, commonly described as a Class 5 switch, for processing telephony signals comprising subscriber channels. A CO Terminal (COT), which is connected to the CO and to one end of a digital carrier line, serves as the communication interface between the CO and components located downstream from the CO, such as remote drop units, on the digital carrier line. The COT can transmit outgoing digital carrier line signals on the digital carrier line in response to multiplexing the subscriber channels of telephony signals received on a wired link from the CO. The COT also can transmit telephony signals to the CO in response to demultiplexing subscriber channels of incoming digital carrier line signals received on the digital carrier line. Because the COT can support the communication of multiple subscriber channels, it will be appreciated that both the outgoing digital carrier line signals and the incoming digital carrier line signals comprise multiplexed subscriber channels. The COT, which is typically powered by a local power source, can insert span power on the digital carrier line to power all active components connected to the downstream portion of the digital carrier line.

The terms "outgoing" and "incoming" are defined with respect to the location of the COT. Specifically, the outgoing digital carrier line signals are generated at the COT, whereas the incoming digital carrier line signals are received at the COT and typically generated by a component downstream from the COT. For example, the COT transmits the outgoing digital carrier line signals on the downstream path of the digital carrier line and receives the incoming digital carrier line signals on the upstream path of the digital carrier line.

At least one remote drop unit, capable of servicing the telephony needs of one or more subscribers, is connected to the digital carrier line. A remote drop unit can receive outgoing digital carrier line signals intended for its subscriber(s) and can generate incoming digital carrier line signals from its subscriber(s). Specifically, the remote drop unit can insert one of the subscriber channels into the multiplexed subscriber channels of one of the incoming digital carrier line signals. In addition, the remote drop unit can retrieve one of the subscriber channels from the multiplexed subscriber channels of one of the outgoing digital carrier line signals. The remote drop unit also can pass those incoming and outgoing carrier line signals carried on the digital carrier line and not intended for communication to the subscribers associated with the unit. These passed signals are typically amplified at the remote drop unit to increase signal levels, thereby eliminating the need to place bidirectional repeaters between any pair of remote drop units. Each remote drop unit can be powered in the field by coupling the span power carried on the digital carrier line. This use of span power eliminates a need for powering the remote drop units from a local power source, which may not be readily available in certain rural installations.

A remote drop terminal anchors the other end of the digital carrier line, at a remote location physically separated and downstream from the COT and the CO. The remote drop terminal provides functions identical to those of a remote drop unit and serves as the termination point for the other end of the digital carrier system.

The digital carrier line signal typically comprises a serial digital data stream including multiple time-division multiplexed, pulse code modulated subscriber channels (DS-0s, 64 kbps) capable of carrying voice and data signals and an overhead control channel (16 kbps) comprising control messages, framing data and timing information. The timing information can be generated at the COT, which distributes a timing signal via the outgoing digital carrier line signal to clock remote drop units and the remote drop terminal. The incoming and outgoing digital carrier signals can be encoded with a modulated line code to support efficient communication of the subscriber channel information via the digital carrier line.

The framing data comprises a framing structure defined by a modified HDSL structure having synchronization data, payload segments, and overhead items. Each payload segment comprises traffic data frames including framing data and subscriber channels. The framing data comprises a framing pattern, cyclic redundancy correction (CRC) data, and an Embedded Operations Channel (EOC). Each overhead channel typically comprises indicators bits, address/control bits, data, and overhead channel CRC data.

The COT can control the distribution of the span power to each remote drop unit and the remote drop terminal by powering selected circuitry in certain components and powering down selected circuitry in the remaining non-selected units. To support the safe distribution of span power, the COT can include a ground fault detector for generating a ground fault detection signal that results in the disconnection of the span power from the carrier line in response to detecting a ground fault condition in the span power distributed over the digital carrier line. An alarm system can generate an alarm in response to the ground fault detector detecting a ground fault condition. This protection system can prevent the accidental electrocution of an individual, such as a technician, who is exposed to the span power signals carried on the digital carrier link.

In view of the foregoing, other objects, features, and advantages of the present invention will become apparent upon reading the following specification, when taken in conjunction with the drawings and the appended claims.

BRIEF DESCRIPTION OF THE DRAWINGS

FIG. 7 is a block diagram illustrating the components of a Central Office Terminal in accordance with an exemplary embodiment of the present invention.

FIG. 11 is a logical flow diagram illustrating the steps of a process for starting the operation of repeater-type components within a digital carrier system in accordance with an exemplary embodiment of the present invention.

FIG. 12 is a logical flow diagram illustrating the steps of a process for operating the repeater-type components of a digital carrier system in accordance with an exemplary embodiment of the present invention.

DETAILED DESCRIPTION OF THE DISCLOSED EMBODIMENT

Figure 1:
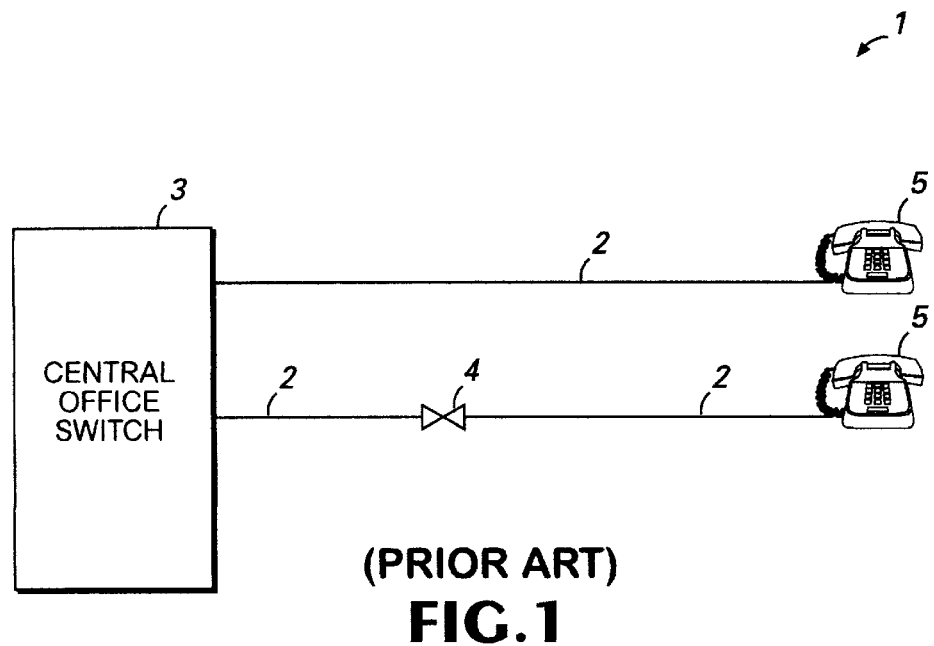
FIG. 1 is a block diagram illustrating a prior direct connection analog-type system for delivering telephony services over copper wire pairs.
Figure 2:
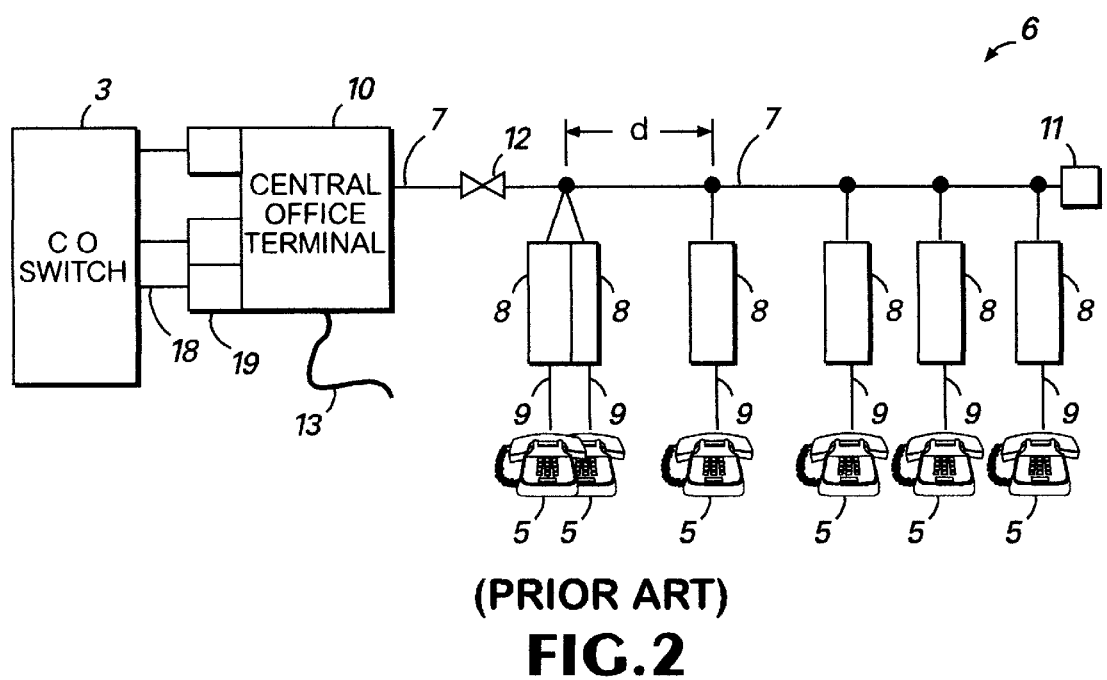
FIG. 2 is a block diagram illustrating the components of a prior Analog Carrier System.
Figure 3:
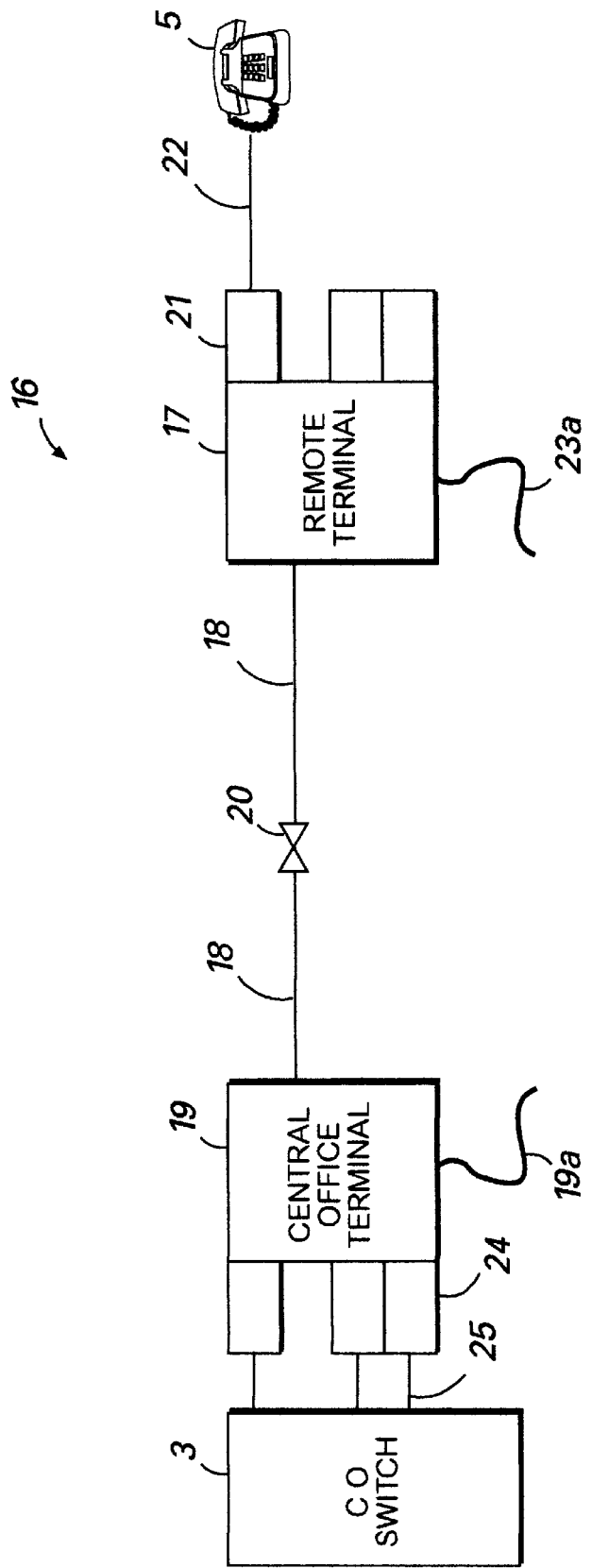
FIG. 3 is a block diagram illustrating the components of a prior Universal Digital Loop Carrier System.
Figure 4:
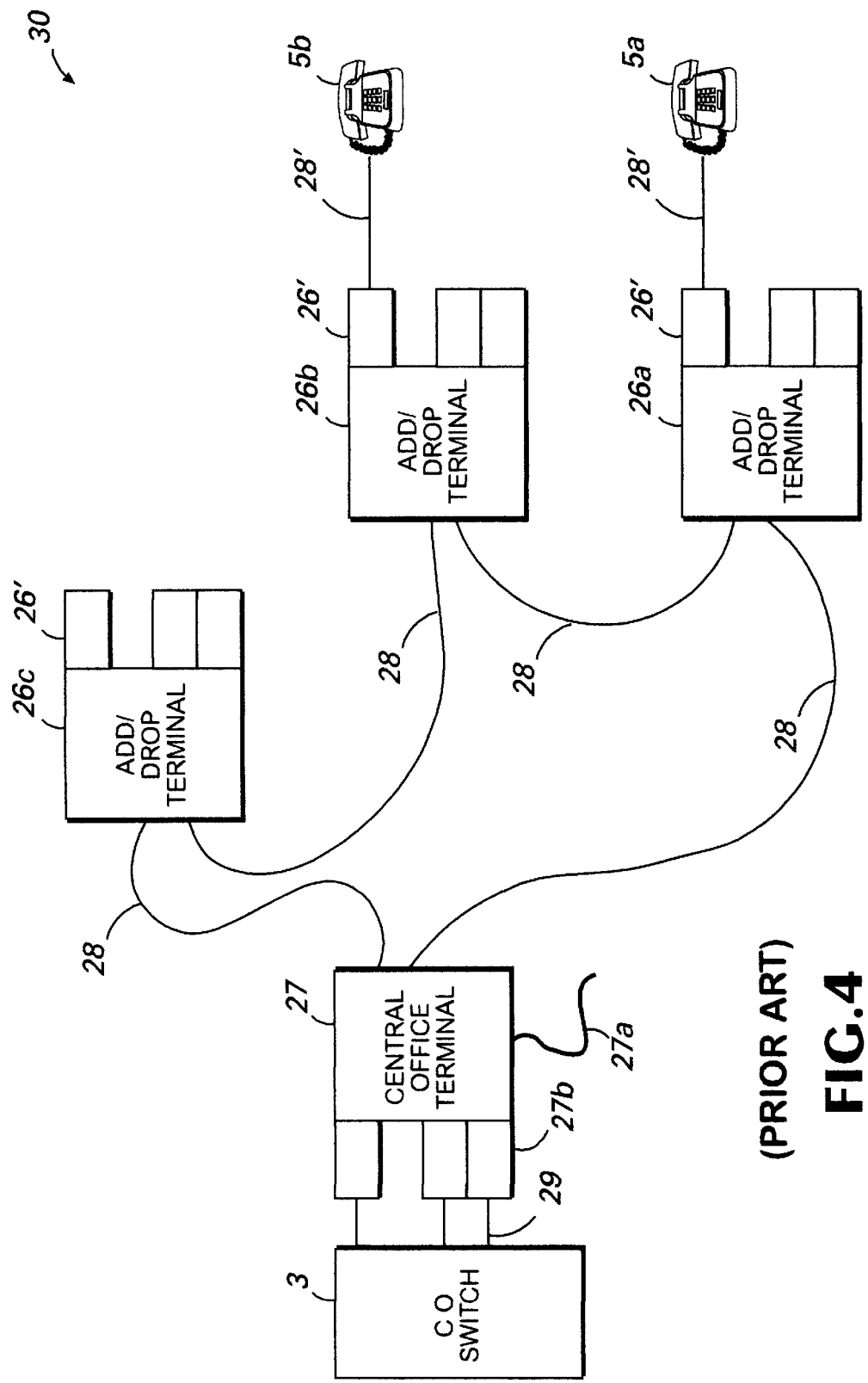
FIG. 4 is a block diagram illustrating the components of a prior Add/Drop Multiplexer System.

The present invention is directed to a digital carrier system (DCS) for primary use as a replacement of the analog direct connection system, shown in FIG. 1, and the generic analog carrier system, shown in FIG. 2, while providing a higher quality of service and allowing the delivery of data services, such as Integrated Services Digital Network (ISDN), Digital Data System (DDS), and Switched 56 services via a digital carrier signal transported by only a single wire pair cable, such as a twisted copper wire pair. The present invention provides the capability to deliver modern voice and data telephony services to existing and new subscribers in rural or isolated locations.

The exemplary DCS embodiment of the present invention can provide voice and data services to subscribers in rural areas that are presently served by analog carrier systems or direct wire connection systems. The population density of these rural areas can be as low as 2 telephones along a 7 mile stretch of road to as many as 40 subscribers clustered in an area with only 6 pairs of wires. Extremely rural areas may have 6 to 8 subscribers located 15 to 20 miles from the serving Central Office (CO).

Analog systems have traditionally been deployed over the past 25 years to avoid the cost of burying copper cable to distant locations represented by small numbers of scattered subscribers. These analog systems are less costly than adding new copper distribution cables but are severely limited in the number and types of voice and data services which can be offered to rural subscribers. Analog systems are susceptible to noise interference and to cross-talk signals, which reduce the quality of the delivered POTS transmissions. Also, the analog carrier system can not support the delivery of CLASS features, such as caller identification, call forwarding, three-way conference calls, etc. As these analog systems continue to age in the field, they become more expensive to maintain and to repair because of the reduced availability of analog-type components and the associated labor costs for traveling to and repairing remote component installations.

To address the technical problems and service limitations encountered by present analog telephony systems, the exemplary DCS embodiment of the present invention utilizes a digital signal multiplexing architecture to deliver digital transmission of voice and data signals, including support for CLASS and high speed analog modem services, via only a single pair wire cable such as a twisted copper pair. This digital transmission capability facilitates the delivery of a full DS-Ø channel to each POTS subscriber, while offering a telephone company the opportunity to gain new revenue sources by marketing advanced telephony and data services. The exemplary DCS embodiment can be powered from the CO location and provides span-voltage power to components downstream from the CO via a carrier line connecting the CO to the downstream components. These downstream components typically include single, dual, and quad drop units, remote drop terminals, and bidirectional repeaters.

Figure 5:
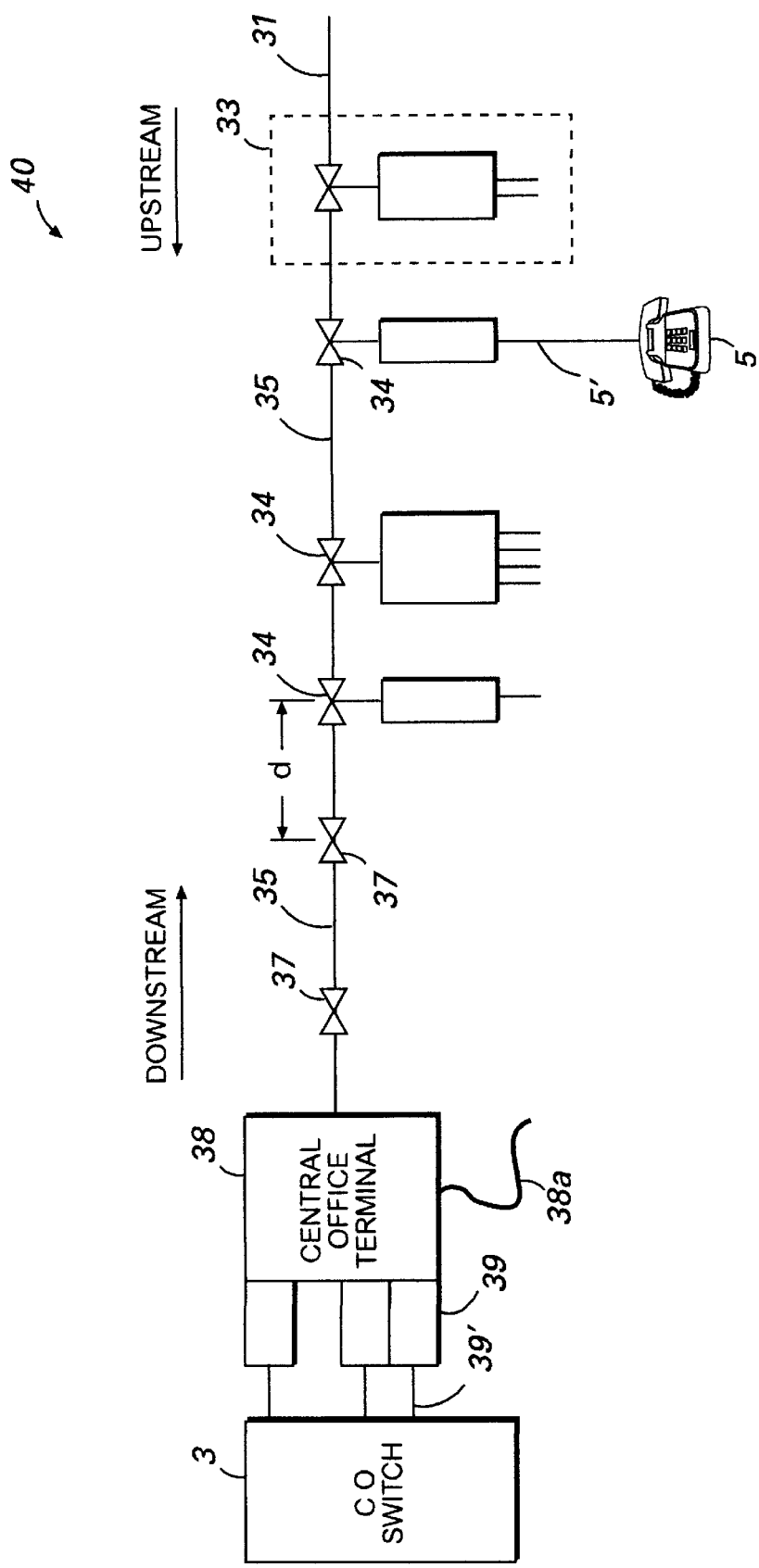
FIG. 5 is a block diagram illustrating the components of a Digital Carrier System in accordance with an exemplary embodiment of the present invention.

FIG. 5 is a block diagram illustrating the components of an exemplary DCS embodiment for use in typical rural telephone and data applications. Referring now to FIG. 5, a DCS or digital carrier system 40 comprises a CO switch 3, a COT 38, a carrier line or bidirectional communication link 35, a remote drop terminal (RDT) 33, one or more remote drop units 34, and CPE 5. In the event of an extended run of the carrier line 35, one or more bidirectional repeaters 37 can be employed within the carrier line to boost the level of signals transported on this line. For purposes of illustration, a pair of the repeaters 37 are placed in the carrier line 35 between the COT 38 and the remote drop units 34. The components of the DCS 40 operate in combination to support private line POTS services having CLASS capability and high speed, analog modem capacity. In addition, the DCS 40 can support conventional ISDN BRI services by carrying 2B+D transmissions. Similarly, the DCS 40 can also support DDS and Switched 56 services for high speed data transmissions.

As suggested by the representative example of the DCS architecture shown in FIG. 5, the CO switch 3 (and the COT 38) is located at a position remote from the remote drop units 34 and the RDT 33. Indeed, the RDT 33, which serves as the termination point for the downstream portion of the carrier line 35, is located at the furthest extension of this transmission line from the CO. The DCS 40 can serve N total subscribers from the combination of the CO switch 3 and the COT 38 to which they are connected via the carrier line 35. Each of the remote drop units 34 and the remote drop terminal 33 service a subset of the total N subscribers. For example, at a selected remote drop unit 34, a subset M of the total N subscribers are serviced at this location, and the remaining subscribers (N–M) are serviced by the remaining remote drop units 34 and the RDT 33.

In general, the remote drop units 34 can be distributed at selected positions along the digital carrier line 35. For example, placement of the remote drop units 34 along the digital carrier line can be random and non-uniform within the limits of attenuation of incoming and outgoing digital carrier line signals. Alternatively, the remote drop units 34 can be evenly-spaced at separate positions along the digital carrier line 35. Also, multiple remote drop units 34 can be placed at a single selected position along the digital carrier line 35. In contrast, the RDT 33 is typically installed at the termination point of the digital carrier line, and "anchors" the end of the digital carrier line opposite the COT 38 and the CO. It will be understood that the DCS 40 is not limited to the representative architecture of downstream components shown in FIG. 5. Indeed, the configuration of components for the DCS 40, as well as the relative position of these components on the digital carrier line 35, is defined by specific requirements of the telephony application for the DCS 40, including subscriber locations and signal levels.

Because the telephony signals distributed by the DCS 40 are carried by a carrier line 35 having a single wire pair cable, typically a copper wire pair, the subscriber channels carried by these telephony signals are preferably time multiplexed with respect to each other. Multiplexing/demultiplexing operations are conducted at the COT 38 and each of the remote drop units 34 and the RDT 33 to support the communication of telephony voice and data signals between the CO switch 3 and the individual subscribers serviced by the DCS 40.

The CO switch 3, typically a Class 5 switch, is connected to the COT 38 via a switch interface card 39 and a link 39'. The COT 38 can include multiple switch interface cards 39 for connection to the CO switch 3 via corresponding wired links 39'. The COT 38 is powered by a local power source 38a. In turn, the COT 38 can provide power for the remaining downstream components by outputting a span voltage signal carried by the carrier line 35. The carrier line 35 extends between the COT 38, each remote drop unit 34, and the remote terminal 33. The RDT 33, also described as an end terminal, is positioned proximate to a termination point 31 of the DCS 40. Each customer premises equipment (CPE) 5, such as a subscriber's telephone handset, is connected to one of the remote drop units 34 or the RDT 33 via a wired link 5', typically a copper wire pair.

The COT 38 is connected to one end of the carrier line 35 and the CO switch 3, which operates to process telephony signals comprising subscriber channels. The COT 38 can be viewed as a communication interface between the CO switch 3 and the components connected to the downstream path of the carrier line 35. The COT 38 can transmit outgoing digital carrier line signals on the carrier line 35 in response to multiplexing subscriber channels of telephony signals received from the CO switch 3 via the combination of the switch interface cards 39 and the links 39'. In addition, the COT 38 can transmit telephony signals to the CO switch 3 via the cards 39 and the links 39' in response to demultiplexing subscriber channels of incoming digital carrier line signals received on the carrier line 35.

The terms "outgoing" and "incoming" are defined with respect to the location of the COT 38. Specifically, the outgoing digital carrier line signals are generated at the COT 38, whereas the incoming digital carrier line signals are received at the COT 38 and generated by a downstream component, such as the RDT 33 or a remote drop unit 34. The COT 38 transmits the outgoing digital carrier line signals on the downstream path of the carrier line 35 and receives the incoming digital carrier line signals on the upstream path of the carrier line 35. It will be appreciated that outgoing digital carrier line signals can be viewed as "transmit" digital carrier line signals, whereas incoming digital carrier line signals can be viewed as "receive" digital carrier line signals.

Each remote drop unit 34 is capable of "dropping" outgoing digital carrier line signals from the carrier line 35 for distribution to subscribers served by the corresponding remote drop unit. Likewise, each remote drop unit 34 can "add" incoming digital carrier line signals to the carrier line 35 on behalf of subscribers serviced by that unit. In particular, a remote drop unit 34 can retrieve one of the subscriber channels from the multiplexed subscriber channels carried by the outgoing digital carrier line signal on the carrier line 35. The remote drop unit 34 also can insert one of the subscriber channels into the multiplexed subscriber channels an incoming digital carrier line signal provided to the carrier line 35. Digital carrier line signals not intended for subscribers of a remote drop unit 34 can be passed by that unit to the appropriate downstream or upstream signal path. These passed signals can be amplified by the remote drop unit 34 to increase signal levels on the carrier line 35. This effectively eliminates a need to place bidirectional repeaters, such as the repeaters 37, between any pair of the remote drop units 34.

Figure 6A:
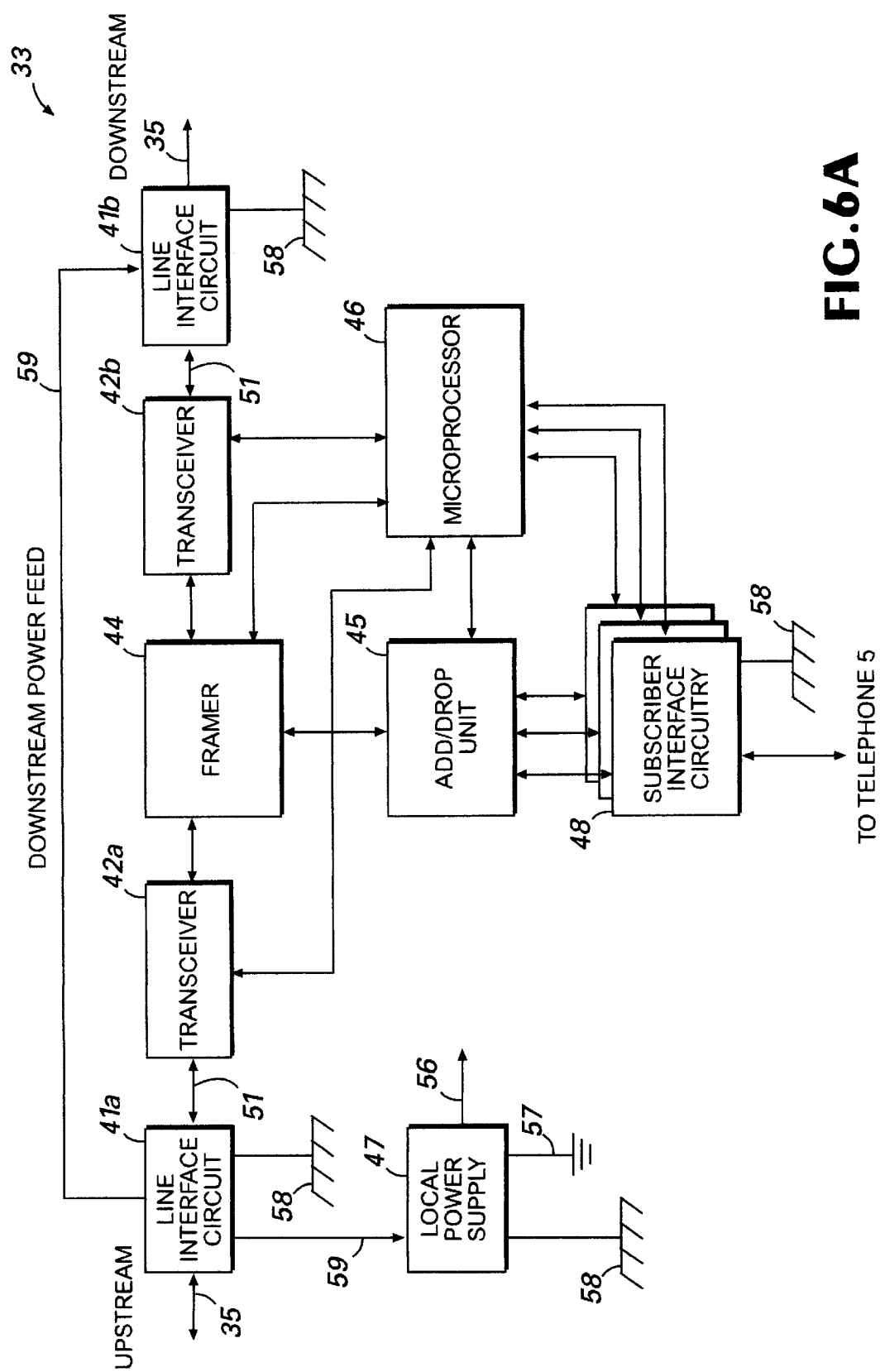
FIG. 6A is a block diagram illustrating the components of a Remote Drop Terminal in accordance with an exemplary embodiment of the present invention.

Each remote drop unit 34 performs operations similar to those conducted by the RDT 33, with the exception that the RDT 33 serves as the terminating point for the carrier line 35, i.e., the final component of the downstream path of the DCS 40. Each remote drop unit 34 and the RDT 33 comprises line interfaces, a framer, an add/drop unit, and one or more subscriber interfaces. The remote drop unit 34 contains a pair of transceivers for communication in both the upstream and downstream signal paths, whereas the RDT 33 includes only a single transceiver based on its operation as the terminating point for the carrier line 35. The subscriber interfaces are not limited to POTS services but can also supply coin phone control, DDS, ISDN, Switched 56, Private Line Automatic Ringdown (PLAR), and other voice and data services. The components of the RDT 33 will be described in more detail below with respect to FIGS. 6A and 6B. The architecture of a remote drop unit 34 is preferably identical to the RDT 33, and FIG. 6A is also useful for illustrating the design of the remote drop unit.

Transmission is accomplished by time-division multiplexing subscriber DS-0 channels onto a single carrier line 35 with full duplex communication capability. Multiple remote drop units 34 can be used on a carrier line, up to and exceeding the capacity of the DCS 40. The remote drop units 34 and the RDT 33 have the capability to support multiple subscriber channels, typically ranging from one subscriber channel to full system capacity. Long spans (12 to 35 kft., depending on wire gage) between remote drop units 34 and the COT 38 typically require the use of digital bidirectional repeaters 37 to amplify digital signal levels on the carrier line 35. The carrier line 35, extending between the COT 38 and RDT 33, does not require any termination device and, hence, the RDT 33 output can be left unterminated (open).

Those skilled in the art will appreciate that a T1-type multiplexer can be used to support the transmission of telephony signals over the extended distances often required for rural telephone service applications. For example, a T1/DCL multiplexer (not shown) can be connected to the CO switch 3 to transport digital carrier signals to multiple digital carrier systems.

System powering is accomplished at the location of the CO switch 3, where the COT 38 is powered by a local −48 Vdc power source, typically including a back-up battery, via an interface cable 38a. All devices located remotely from the COT 38, namely, the repeaters 37, the remote drop units 34, and the RDT 33, are powered by span power carried on the carrier line 35. This power is preferably in the form of a balanced DC voltage, with respect to ground, which is applied to the tip and ring pair of the carrier line 35 by a span power supply (not shown) located at the COT 38. Power for the DCS 40 can be conserved by powering down unused circuitry as required. For example, a transceiver in the RDT 33, which faces away from the CO 3, as indicated by termination point 31, and any unused (not provisioned) subscriber interfaces can be powered down by a command carried over the carrier line 35.

Although the incoming and outgoing digital carrier signals and the span power are typically carried by only a single cable pair to components downstream from the COT 38, the span power also may be carried separate from the digital carrier signals by an additional cable pair. In other words, the DC voltage of span power is carried by a twisted wire pair that is separate from the single cable carrying the incoming and outgoing digital carrier signals.

A time-division, multiplexed (TDM) digital carrier signal, which is transported on the carrier line 35, is arranged into frames using a structure similar to that used for High-bit-rate Digital Subscriber Line (HDSL) transmission of T1 payloads and T1 Extended Super Frame (ESF), as will be described in more detail below with respect to FIG. 8. The transmission frame preferably comprises 64 kbps Pulse Code Modulated (PCM) channels and one 16 kbps overhead channel. The digital carrier line code for the digital carrier signal is typically the 2B1Q code, which offers quality performance on copper wire loops and can be used with HDSL and ISDN BRI transmissions.

The overhead channel is used to communicate messages between the COT 38, the remote drop units 34, and the RDT 33. The overhead channel can include the following information in messages: framing, synchronization and bit timing, ISDN "D" channel information, component provisioning, maintenance, and inventory. For example, when the CPE 5 connected to the RDT 33 originates an outgoing call, signaling messages (off-hook and dialing) are transmitted to the RDT 33 via the drop wire pair 5'. Messaging is sent via the overhead channel from the RDT 33 to the COT 38 along the carrier line 35, passing through the repeaters 37 and the remote drop units 34 in the upstream path. Those skilled in the art will appreciate that the overhead channel may be used for other functions as required.

System timing is derived from either an internal time base or by a BITS clock interface of the COT 38. The internal time base can be used for POTS-only applications, while the BITS clock is used for ISDN BRI transport. The RDT 33 and each remote drop unit 34 is preferably synchronized to system timing by timing signals carried via the carrier line 35 from the COT 38. The timing signals are typically inserted within the overhead control channel.

Maintenance and testing of the DCS 40 can be accomplished at the CO switch 3. Typical test functions include: (1) digital carrier line testing via loopbacks and Bit Error Rate (BER) tests; (2) channel fault location; and (3) self tests. These testing functions are useful for both system installation and troubleshooting applications. A personal computer, such as an IBM-compatible computer, can be connected to the CO switch 3 via a conventional cable link, such as an RS-232 or RS-485 cable, to support system maintenance and test functions. One or more software programs residing on the personal computer can communicate with the CO switch 3 to complete the desired maintenance or testing application.

The types of services provided by the RDT 33 can cover the range of DS-0 level services offered by telephone companies today. An RDT can include single, dual, quad or 8 drop units as required to support flexible deployment of the digital carrier system for a particular rural telephony service application. For example, an RDT having a single remote drop unit can terminate a single POTS subscriber line and can multiplex the signals carried by this line onto a single DCL wire pair. This subscriber channel can be multiplexed with other subscriber channels on the same DCL wire pair for transmission to the CO. In addition, the RDT can perform add/drop signal operations and bidirectional repeater operations.

The components of the RDT 33 are shown in FIG. 6A. Turning now to FIGS. 5 and 6A, the CPE 5 is connected to a subscriber interface circuit (SIC) 48. The SIC 48 provides the interface between the SIC 48 and an add/drop unit 45 under the control of a microprocessor 46. The number of SICs 48 per RDT 33 can range from 1 to a number limited by the number of subscriber channels carried on the line 35. For the DCS 40, the RDT 33 can include multiple SICs 48, typically up to eight SICs, to support a corresponding number of subscriber channels.

A line interface 41a is connected to the upstream path of the carrier line 35 and outputs a digital carrier line signal 51 in a 4-wire configuration to an upstream transceiver 42A. To distribute power in the RDT 33, a span voltage 59, in a range of approximately 150 to 330 Vdc across tip and ring of the line 35, is separated from the received digital carrier line signal 51 in the line interface 41A. The span voltage 59 is forwarded to a local power supply 47 and to a downstream line interface circuit 41B. The local power supply 47 converts the span voltage 59 to a regulated low voltage 56 for powering components of the RDT 33. This local power is referenced to a local ground 57, which is preferably connected to an earth ground 58. The line interface 41B combines the span voltage 59 with the digital carrier signal 51 and outputs the combined signal to the downstream signal path of the line 35 for reception by the next remote drop unit 34 or repeater 37. The line interfaces 41A and 41B and the SICs 48 provide both primary and secondary protection for the RDT 33 and are preferably connected to earth ground 58.

The RDT 33 preferably includes a pair of transceivers, the upstream transceiver 42A and its counterpart, a downstream transceiver 42B. Each transceiver 42A and 42B provides level translation and amplification. In addition, the transceiver 42A recovers the digital carrier line signal output by the line interface 41A and converts this encoded signal into a binary digital format for subsequent processing by a framer 44. This conversion operation typically includes converting the encoded signal into a binary-level serial data stream that is outputted to the framer 44. The transceiver 42A also can conduct certain signal measurements directed to communication performance levels, such as a signal-to-noise ratio measurement. The downstream transceiver 42B can perform functions similar to those of the upstream transceiver 42A with the exception that the downstream transceiver 42B is responsible for encoding a digital data stream output by the framer 44 to place the data within the line code. The upstream transceiver 42A and the downstream transceiver 42B are preferably implemented by a transceiver component available from Brooktree as Model BT8970.

The framer 44, which is connected between the transceivers 42A and 42B and an add/drop unit 45, can extract overhead information from both outgoing digital carrier line signals and incoming digital carrier line signals. The framer 44 can pass the processed outgoing digital carrier line signals to the add/drop unit 45 and can accept incoming digital carrier line signals from the add/drop unit 45. The framer 44 is preferably implemented by a framer component available from Brooktree as Model BT8953. The add/drop unit 45 can extract subscriber channels from the outgoing digital carrier line signals and can insert subscriber channels into the incoming digital carrier line signals. The add/drop unit 45, which is connected to the framer 44 and to each SIC 48, can pass extracted subscriber channels and accept subscriber channels for insertion from the SICs 48. The add/drop unit 45 is described in more detail below with respect to FIG. 6B.

A microprocessor 46, also described as a controller, obtains information from the overhead channel, carried by the digital carrier line signal 51, in response to the framer 44 extracting overhead channel signals from the line 35. The microprocessor 46 controls the operation and configuration of the SICs 48, the add/drop unit 45, the framer 44, and transceivers 42A and 42B.

ISDN BRI services can be delivered from the RDT 33 via the use of an appropriate SIC 48. Variations on the conventional 2B+D format can also be used to increase the number of subscribers that can be served on a typical digital carrier system. Transmission of the 2B+D BRI service requires 3 DS-0 time-slots using industry standard formatting for the "D" channel. However, ISDN services with reduced capability also can be provided to reduce the number of DS-0s needed for transport. Table 1 summarizes the key parameters of ISDN services supported by the DCS 40 configured as an 8-channel system.

TABLE 1

ISDN Service Capability

| Services | Number Per 8 channel System | No. DSOs/ subscriber | Call control channel | "D" Channel capability |
|---|---|---|---|---|
| 2B + D | 2 | 3 | D channel | dialing & packet data |
| 2B + 0D | 4 | 2 | EOC | |
| B + 0D | 8 | 1 | EOC | |

It will be understood that the architecture of each remote drop unit 34 is identical to the RDT 33. Those skilled in the art also will appreciate that the architecture of the repeater 37 is similar to the RDT 33, except the repeater does not contain the subscriber interface circuits 48, the add/drop unit 45, and associated interconnections.

Similar to the RDT 33, the remote drop unit 34 comprises counterparts to the upstream and downstream line interface 41A and 41B, upstream and downstream transceivers 42A and 42B, framer 44, add/drop unit 45, subscriber interface circuits 48, and controller 46. Generally described, each remote drop unit is connected to the digital carrier line and can insert and/or retrieve subscriber channels by processing multiplexed subscriber channel signals. For example, the remote drop unit can insert a subscriber channel into multiplexed subscriber channels of an incoming digital carrier line signal. Similarly, the remote drop unit can retrieve subscriber channels from multiplexed subscriber channels of an outgoing digital carrier line signal. The inserted subscriber channel originates from the corresponding subscriber, whereas the retrieved subscriber channel is intended for delivery to the corresponding subscriber. Consequently, the incoming digital carrier line signal carrying the inserted subscriber channel can be viewed as a "transmit" incoming digital carrier line signal, whereas the outgoing digital carrier line signal carrying the retrieved subscriber channel can be viewed as a "received" outgoing digital carrier line signal. In addition, each remote drop unit can pass both incoming digital carrier line signals and outgoing digital carrier line signals that are not intended for delivery to a subscriber associated with the corresponding remote drop unit.

The upstream line interface, which is connected to the upstream path of the digital carrier line, can process the outgoing digital carrier line signal received on the upstream path. In response to signals received on the upstream path, the upstream line interface can output an outgoing digital carrier line signal to the upstream transceiver and can output span power for powering the circuitry of the remote drop unit. The upstream transceiver responds to the outgoing digital carrier line signal by generating a decoded outgoing digital carrier line signal. The framer, which is connected to the upstream transceiver, can generate a processed outgoing digital carrier line signal in response to extracting overhead channel information from the decoded outgoing digital carrier line signal. The add/drop unit, which is connected to the framer and to each subscriber interface circuit, can generate an extracted subscriber channel in response to demultiplexing the processed outgoing digital carrier line signal to extract one of the subscriber channels. In turn, a subscriber interface circuit can forward the extracted subscriber channel to a corresponding subscriber interface circuit for the CPE of the intended subscriber.

For signals not intended for delivery to a subscriber associated with the remote drop unit, the downstream transceiver responds to the processed outgoing digital carrier line signal output by the framer by generating an encoded outgoing digital carrier line signal. The downstream line interface, which is connected to the downstream transceiver and to the downstream path of the digital carrier line, can combine the encoded outgoing digital carrier line signal and span power for distribution in the downstream path.

For a subscriber channel originated by a subscriber, a subscriber interface of the corresponding remote drop unit can forward the subscriber channel from the CPE to the add/drop unit. The add/drop unit can generate an inserted subscriber channel signal in response to multiplexing an incoming carrier signal to insert the subscriber channel. In turn, the framer can generate a processed incoming digital carrier line signal in response to inserting overhead channel information into the inserted subscriber channel signal output by the add/drop unit. In response to the processed incoming digital carrier line signal, the upstream transceiver can generate an encoded incoming digital carrier line signal to the upstream line interface. The upstream line interface responds by transmitting the incoming digital carrier line signal on the upstream path based on processing of the encoded incoming digital carrier line signal.

The downstream line interface also can receive incoming digital carrier line signals on the downstream path. In response to an incoming digital carrier line signal output by the downstream line interface, the downstream transceiver can generate a decoded incoming digital carrier line signal. The framer responds to the decoded incoming digital carrier line signal by extracting overhead channel information and generating a processed incoming digital carrier line signal. The upstream transceiver responds to the processed incoming digital carrier line signal by generating an encoded incoming carrier line signal. In turn, the upstream interface can transmit the incoming digital carrier line signal on the upstream path in response to processing the encoded incoming digital carrier line signal.

Figure 6B:
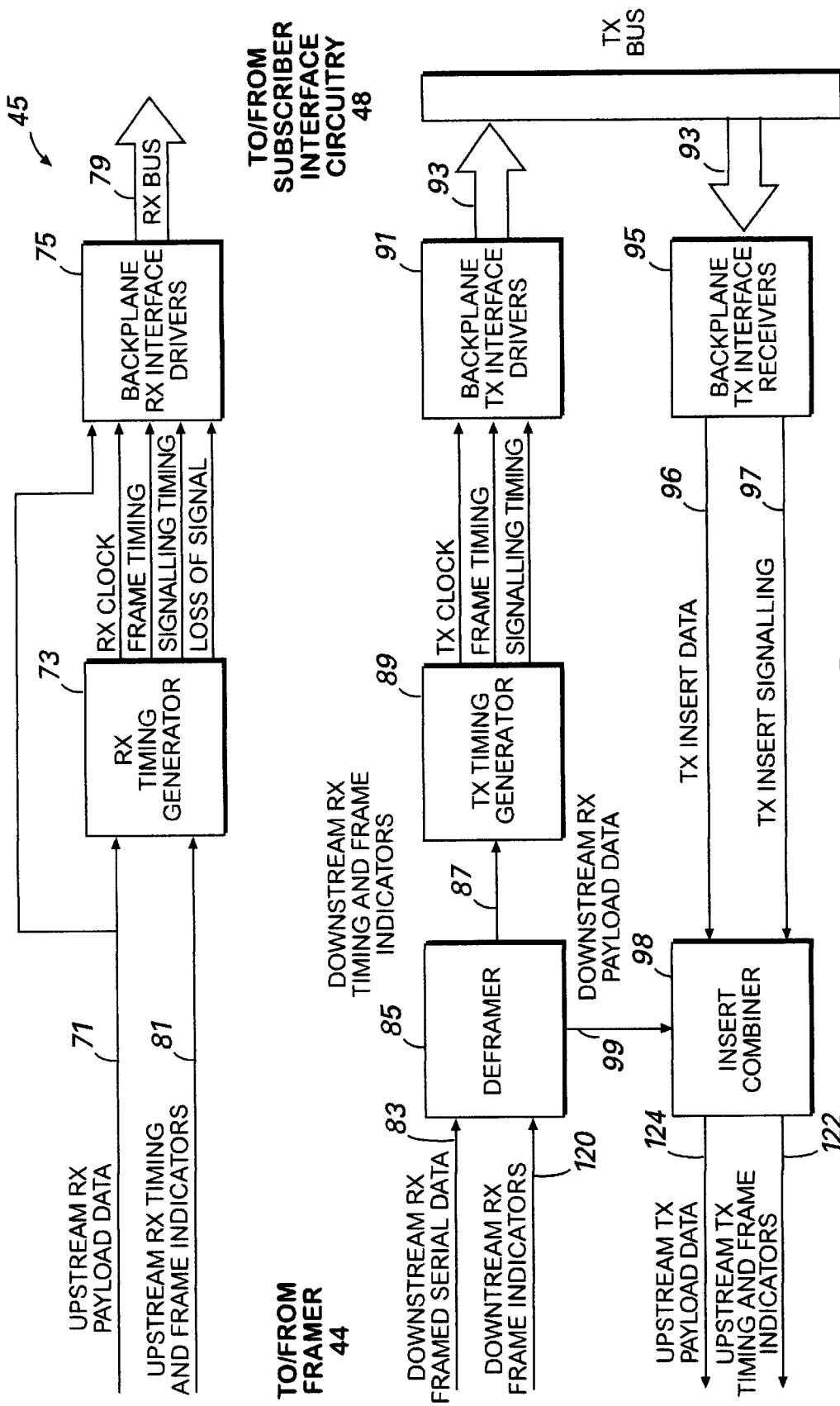
FIG. 6B is a block diagram illustrating the components of an Add/Drop unit for the Remote Drop Terminal shown in FIG. 6A.

Turning now to FIGS. 5, 6A, and 6B, the add/drop unit 45 provides the capability to convert upstream receive (RX) payload data 71 to a format that can be utilized by the SIC 48. It also provides the capability to insert transmit data from the SIC 48 into the downstream RX framed serial data stream 83 for re-transmission in the upstream TX payload data 124.

Upstream RX payload data 71 and upstream RX timing and frame indicators 81 are input to the add/drop unit 45 from the framer 44. The data and timing information are decoded by the RX timing generator 73 to provide formatted signals to be sent to the system backplane. A backplane RX interface driver 75 translates the formatted signals for use by the SIC 48 and outputs the signals onto a RX bus 79.

Downstream RX framed serial data 83 and downstream RX frame indicators 120 are analyzed by a deframer 85. Downstream RX payload data 99 is sent to an insert combiner 98 and downstream RX timing and frame indicators 87 are sent to a transmit (TX) timing generator 89. The TX timing generator 89 decodes the timing information, and provides a formatted signal to be sent to the system backplane. Backplane TX Interface Drivers 91 translate the formatted timing signals for use by the SIC 48 and output the signals onto a TX Bus 93. The SIC 48 uses these timing signals to output transmit data onto the TX Bus 93, which is received by the Backplane TX interface receivers 95. These receivers convert the signals from the SIC 48 into TX insert data 96 and TX insert signaling 97 to be used by the insert combiner 98. The insert combiner 98 multiplexes the SIC TX insert data 96 and TX insert signaling 97 with the downstream RX payload data 99 to create a new payload data stream that contains both data packets. This new payload data is output to the Framer 44 as upstream TX payload data 124 along with new upstream TX timing and frame indicators 122.

The components of the COT 38 are shown in FIG. 7. Turning now to FIGS. 5 and 7, the functionality of the COT 38 is similar to the RDT 33 in that signal flow follows a path formed by the combination of the line 35, a line interface 60, a transceiver 62, and a framer 64. The line interface 60 can accept incoming digital carrier line signals from the upstream path of the carrier line 35 and can output outgoing digital carrier line signals in the downstream path of the carrier line 35. The transceiver 62 conducts receive operations on incoming digital carrier line signals and supports transmitting operations for outgoing digital carrier line signals. For receive operations, the transceiver 62 can decode the incoming digital carrier line signals, which are encoded with a line code. Similarly, the transceiver 62 can output digital outgoing carrier line signals encoded with a line code. The framer 64 can extract overhead channel information from the processed incoming digital carrier line signals and can place overhead control channel information within the outgoing digital carrier line signals. A microprocessor 67 can control the operations performed by the transceiver 62, and the framer 64. In addition, the microprocessor 67 can communicate in a bidirectional manner with the switch interface cards 39 via a connection 69 to the bus interface logic 66.

For example, in response to an incoming digital carrier line signal, the framer 64 can output a deframed digital stream to a bus interface circuit 66, where time slots are placed on a bus 68 and passed to switch interface cards 39. Demultiplexing is accomplished by using time division multiplexing, where time slot #1 is mapped to card position #1, etc. There is no provision for time slot interchange in the bus interface circuit 66.

Timing for the DCS 40 can be derived from an internal timing source 67 or by a BITS clock 63 processed by a clock generator 65. The internal timing source 67 is useful for POTS applications, while the BITS clock 63 is primarily useful for supporting ISDN BRI service. The timing signal output by the clock generator 65 is forwarded to the framer 64 via the bus interface circuit 66. The framer 64 can place the timing-related information as timing signals within the overhead channel of the digital carrier line signal. It will be appreciated that timing for the subscriber interfaces of the RDT 33, which typically require telephone network timing, can be derived from the timing signals carried by the digital carrier line signal.

Local power 70, nominally ±5 Vdc, +3.3 Vdc, and other DC voltages, is generated by a power supply 72 in response to receiving the CO-supplied −48 Vdc via a power cable 38a. The local power supply 72 provides low DC voltage to the components of the COT 38, with the exception of the span power supply 74, which is powered directly from the CO power bus. Span power voltage 76 ranges from 260 to 380 Vdc tip to ring when applied to the line 35 at power levels up to 60 W. The span power voltage 76 passes through a ground fault detector (GFD) 78 prior to insertion of the span power voltage 59 to line 35.

The GFD 78 serves the purpose of protecting telephone company personnel from shock or injury, should they come in contact with one of the copper wires carrying span power in line 35. The GFD 78 is referenced to the earth ground 58 and monitors current in this line from the span power supply. A current, measured from either tip or ring of line 35 to earth ground, of 0.1 to 5 mA can be detected by the GFD 78. In response to detecting a ground fault condition, the GFD 78 can take two actions. First, the GFD 78 can generate a ground fault detection signal that causes a span power control unit (not shown) to disconnect the span power voltage 76 at the line interface circuit 60. The line interface circuit 60 can be connected to earth ground 58 via a CO grounding system to provide secondary protection. Hence, the hazardous voltage on the line 35 is removed. Secondly, the GFD 78 generates a signal to notify the microprocessor 67 of the fault via a connection 80. In turn, the microprocessor 67 can issue a "Red" alarm, and "Multiple Subscribers Out of Service" alarm via alarm relays 82 and alarm I/O connections 84. After processing by a ground fault recovery algorithm, the microprocessor 67 can reset a GFD connection 86.

System provisioning can be performed with the use of an IBM-compatible computer 88, which can be connected to a RS-232 interface 90 via a cable 92. The computer 88 typically runs a DOS or Windows-based terminal emulation program or custom software. System provisioning also can be accomplished via an external communications network connected to a RS-485 interface 94. The COT 38 further comprises operator LEDs and switches, as shown in functional block 77 of FIG. 7.

Figure 8:
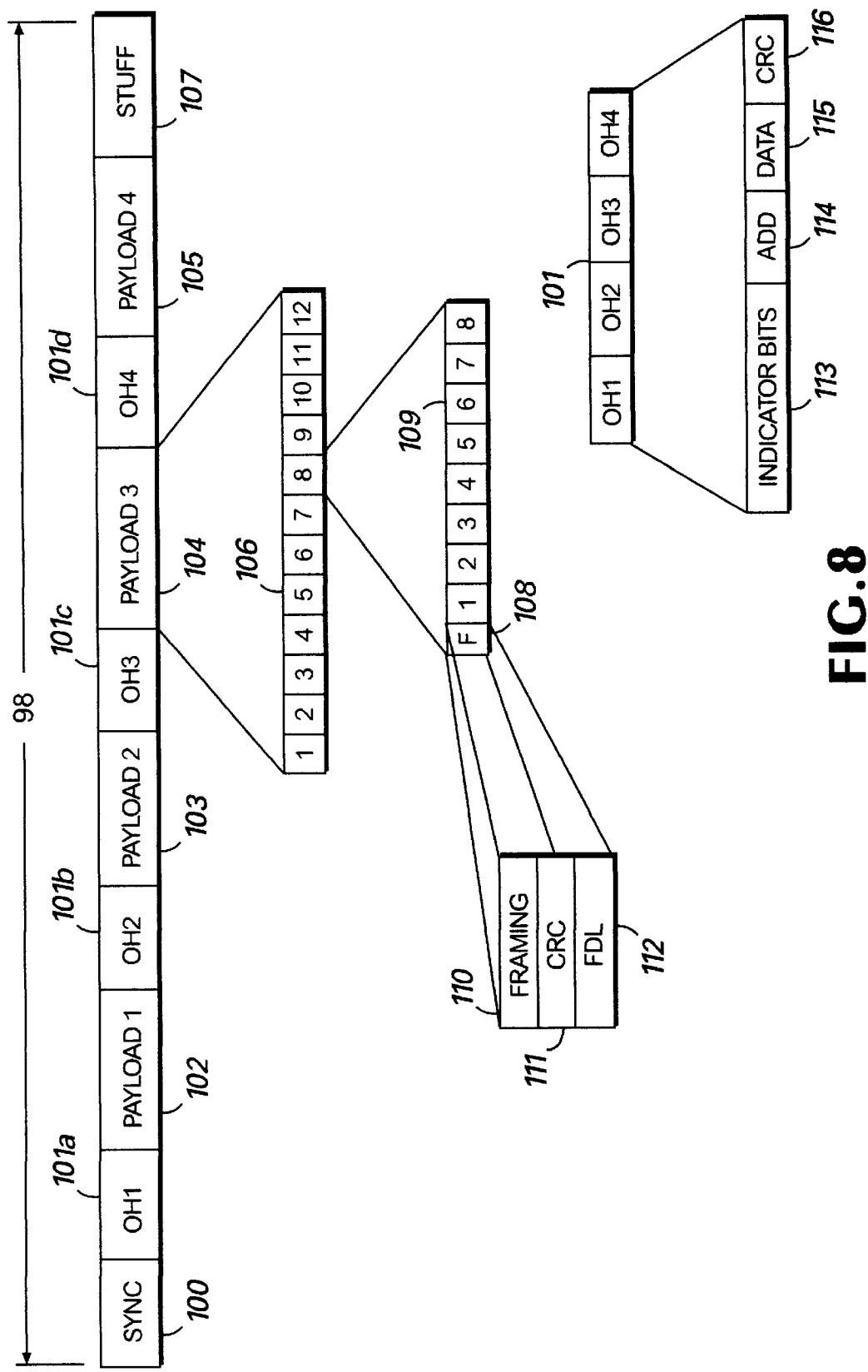
FIG. 8 is an illustration of an exemplary Framing Structure for use with the Digital Carrier System shown in FIG. 5.

FIG. 8 is a diagram illustrating the framing and bit assignment structure for the exemplary DCS embodiment of FIG. 5. Referring now to FIGS. 5, 6A, 6B, 7, and 8, the framing structure can be generated by the framer 64 and bus interface logic 66 in the COT 38 for outbound traffic and by the framer 44 and add/drop unit 45 in the RDT 33 for inbound traffic. The framing and multiplexing structure is based on the HDSL frame structure, as defined by ANSI T1 Technical Report No. 28, with modifications, and T1 ESF framing with modifications. The transport rate allows 64 kbps for each subscriber channel and 16 kbps for overhead and framing functions. The framing structure shown in FIG. 8 illustrates the representative example of eight subscriber channels.

A super frame structure 98, which is shown in FIG. 8, comprises the following elements: a 14-bit synchronization word 100, a 32-bit overhead channel 101, which is distributed in the frame as OH1 to OH4 items 101A, 101B, 101C, 101D, 4-payload segments 102, 103, 104, and 105, each consisting of 12-traffic data frames 106, and a stuff bit segment 107. This super frame can be repeated every 6 mS when the bits are clocked at 528 kbps. The total overhead channel is 48 bits every 6 mS for a combined overhead rate of 8 kbps at the super frame level.

Each payload segment 102, 103, 104, and 105 consists of 12-traffic data frames 106. The payload segment 102 contains traffic data frame numbers 1–12. The payload segment 103 contains traffic data frame numbers 13–24. The payload segment 104 contains traffic data frame numbers 25–36. The payload segment 105 contains traffic data frame numbers 37–48. Each traffic data frame 106 contains one framing bit 108 and 8-traffic DS-0 channels 109.

Each traffic data frame 106 has a framing format based on a modified T1 ESF format. Modifications include reducing the number of traffic DS-0s 109 to match the system requirements and using the Frame Data Link (FDL) channel to transport ISDN D channel messaging in systems that transport reduced bandwidth ISDN BRI service. The framing bit 108 operates at a 8 kbps rate and carries 3 interleaved channels: a framing pattern 110 (2 kbps), a CRC 111 (2 kbps) and a FDL 112 (4 kbps). Each traffic data frame 106 comprises 65 bits.

The 32-bit superframe overhead channel 101 comprises 4 fields 101A, 101B, 101C, and 101D with varying size. They are defined by HDSL convention: 13-indicator bits 113, 5-address/control bits 114, 8-data bits 115, and 6-bits for a CRC 116 calculated on the super frame. The address and control bits 114 and the data bits 115 form the embedded operations channel (EOC) as defined by conventional HDSL framing structure. The EOC typically includes address, data, and control-related information. For example, each remote drop unit can be assigned a unique address to support an assignment of a selected function to that component via the EOC based on the corresponding address. Consequently, it will be appreciated that the control information can include commands for assigning a selected function to be performed by a downstream component, such as the remote drop unit 34.

The CRC 116 and indicator bits 113 are used as defined by the HDSL framing structure. The 5-bit address and control field 114 is preferably unused. The data field 115 is used with a modified subset of the X.25 protocol, as defined in AT&T Publication 54016, to carry data, address, and control information between the COT 38, the remote drop units 34, and the RDT 33 or the COT 38 and the repeaters 37. The stuff bit field 107 comprises either 0, 2, or 4 stuff bits to allow for frame timing adjustments.

A start-up procedure can be completed by the exemplary digital carrier system 40 of FIG. 5 to transition from the non-operational state to the operational state. The start-up procedure allows the components of the digital carrier system to adapt to the characteristics of the bidirectional communications link and to support reliable communication at a predetermined data rate. For example, the start-up procedure enables the COT 38 to determine the total number of remote drop units 34 and the remote terminal 33 that are connected to the bidirectional communications link. The COT 38 can compare the number of downstream components obtained during the start-up procedure to the known number of these components to determine if a component is non-operational or if the communications link is broken.

In general, each remote drop unit 34 and the remote terminal 33 includes transceivers for upstream and downstream communication. For a cold start of the exemplary digital carrier system 40, each transceiver must adapt to the characteristics of the bidirectional communications link to support reliable data communication at the appropriate data rate. For example, each of the remote drop units 34 and the remote terminal 33 can acquire timing characteristics during the start-up procedure.

Figure 9:
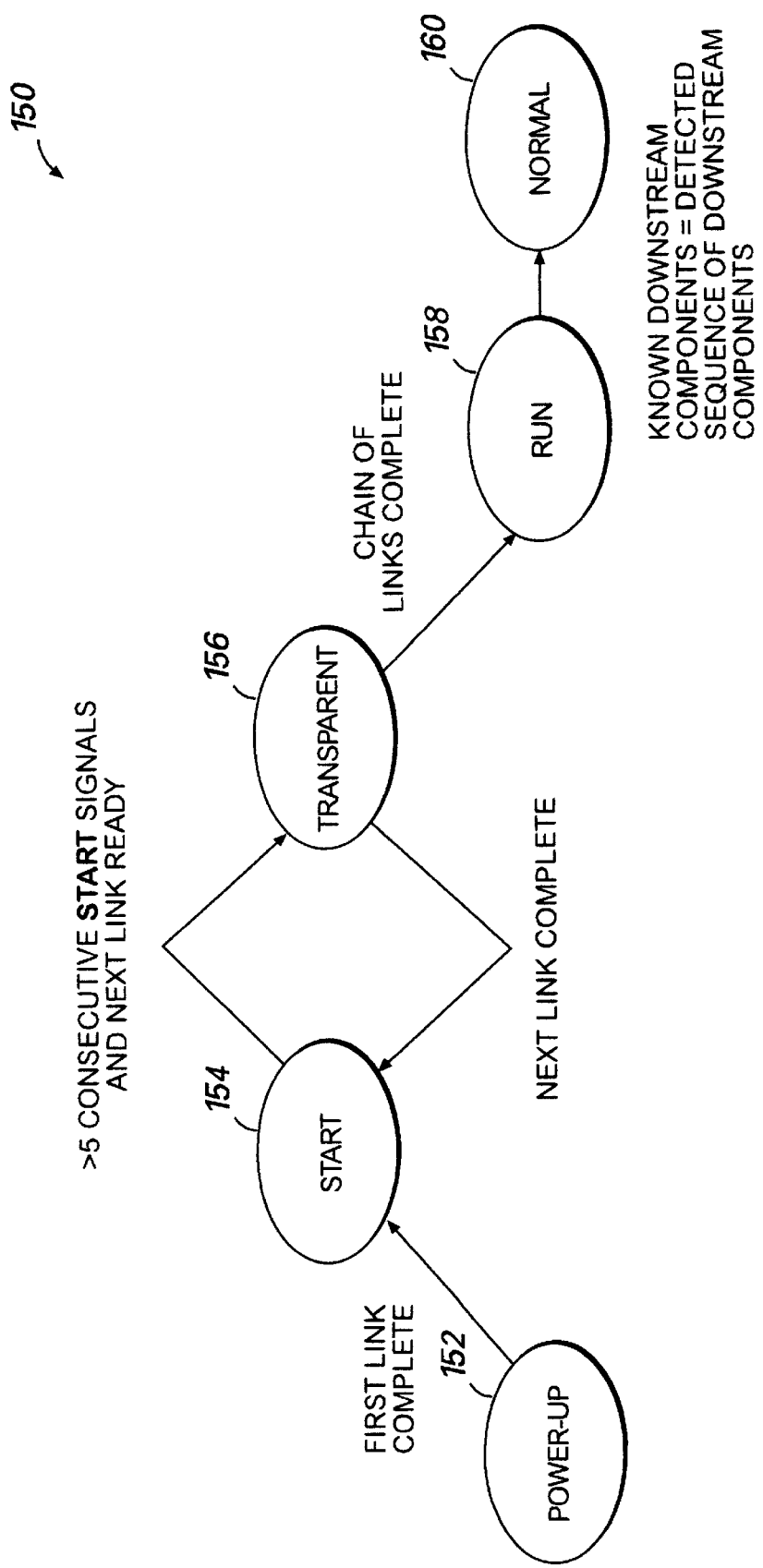
FIG. 9 is a state diagram illustrating the states of a start-up sequence for a digital carrier system in accordance with an exemplary embodiment of the present invention.

FIG. 9 is a state diagram generally illustrating the primary states of a start-up process for the digital carrier system 40. Turning now to FIGS. 5 and 9, a start-up process 150 begins at a power-up state 152 to initialize components downstream from the COT 38 in an adaptive training mode. In the adaptive training mode, each of the remote drop units 34 and the remote terminal 33 on the bidirectional communications link 35 is configured for loop-back operation in the upstream direction. In addition, the link between the COT 38 and the first downstream component (the "first downstream link"), as well as the link between each pair of remaining downstream components, are adapted for communication operations. A microprocessor within each downstream component can monitor and control these training operations. In particular, the microprocessor can control the training operations completed by the upstream and downstream transceivers of each of the downstream components.

In response to the COT determining that training for the first downstream link is complete, the start-up process 150 will transition from the power-up state to a START state 154. In the START state 154, the COT generates a START signal transported in an EOC signal. The most significant bit of the START signal is set to a logical zero value. The START signal will travel the carrier line 35 in the downstream direction until it reaches a downstream component operating in the upstream loopback mode. This downstream component will respond to the START signal by forwarding this signal in the upstream direction, thereby returning the START signal to the COT. The COT will receive on the incoming portion of the loop the START signal that it originally transmitted on the outgoing portion of the loop. In turn, the COT 38 can generate yet another START signal.

In response to receiving more than five consecutive START signals, the downstream component will conduct an inquiry to determine whether adaptive training operations have been completed for the link between itself and the next downstream component. In other words, this downstream component will test whether the link between its downstream transceiver and the upstream transceiver of the next downstream component has been trained for communication operations. If so, the start-up process 150 transitions from the START state 154 to a transparent state 156.

In the transparent state 156, the downstream component transitions from the upstream loopback mode to the transparent mode. This transition causes the downstream component to pass signals to the downstream path rather than returning signals to the upstream path. In addition, the downstream component can increment the START signal prior to passing this signal to the downstream path. This effectively completes a loop between the downstream component operating in the transparent mode and the next downstream component, which continues to operate in the upstream loopback mode.

It will be appreciated that the COT 38 will receive an incremented START signal echoed from the component operating immediately downstream from the component that has transitioned to the transparent state, i.e., the next downstream component operating in the upstream loopback mode. The value of this incremented START signal will equal the physical sequence of that component in the downstream path. In response to completing the downstream loop, the start-up sequence 150 transitions from the transparent state 156 to the START state 154 to continue operations for the next downstream loop. In this manner, each component in the downstream path will transition from the upstream loopback mode to the transparent mode in a ripple fashion, with the exception of the final end component connected to the bidirectional communications link.

For example, in a system comprising two remote drop units and a remote terminal in a downstream path, the sequence of echoed START signals would have values of 1, 2, and 3. If the repeater is not in the transparent mode, the START signal is processed without incrementing the signal. Consequently, the first echoed START signal is identical to the original START signal.

In response to detecting the end component, the start-up process 150 transitions from the transparent state 156 to a RUN state 158. In the run state 158, the COT generates a RUN signal for transmission to the components in the downstream path. In contrast to the START signal, the most significant bit of the RUN signal is set to a logical 1 value. In response to the RUN signal, each component in the downstream path determines whether the link between itself and the next downstream component is ready for normal communication operations. If not, the downstream component determines that it is the end component, and adopts a configuration for an end terminal. The end terminal configures itself to perform loop-back rather than pass-through operations. In addition, if the end terminal is equipped to remove the power feed in the downstream direction, it will do so. Each downstream component processes the RUN signal by incrementing the value of the signal and passing the incremented RUN signal to the next upstream component. This process of incrementing and passing the RUN signal will continue until the COT is reached in the upstream path.

The COT 38 should receive an "echoed" RUN signal having a value representing the total number of downstream components. In the event that the value of the echoed RUN signal does not match the known number of downstream components, the COT 38 will determine that the digital carrier system has entered an error condition. For example, a downstream link between components may be broken, thereby preventing the system from returning an echoed RUN signal having a value associated with the correct number of downstream components.

In response to receiving an echoed RUN signal having a value representing the number of known downstream components, the start-up sequence 150 transitions from the RUN state 158 to a NORMAL state 160. In the NORMAL state 160, the digital carrier system 40 conducts normal communications operations.

Significantly, data related to the adaptive training of the downstream components connected to the digital carrier line can be retained within memory of these units. Consequently, a completion of the task for the start-up procedure described with respect to FIG. 9 can be conducted in an expedited fashion by accessing the stored training data during a re-start of the digital carrier system 40. This re-start operation, also described as a "warm" start proceeds more quickly than an initial start-up process based on access to the stored training information for the components connected to the digital carrier line.

Figure 10:
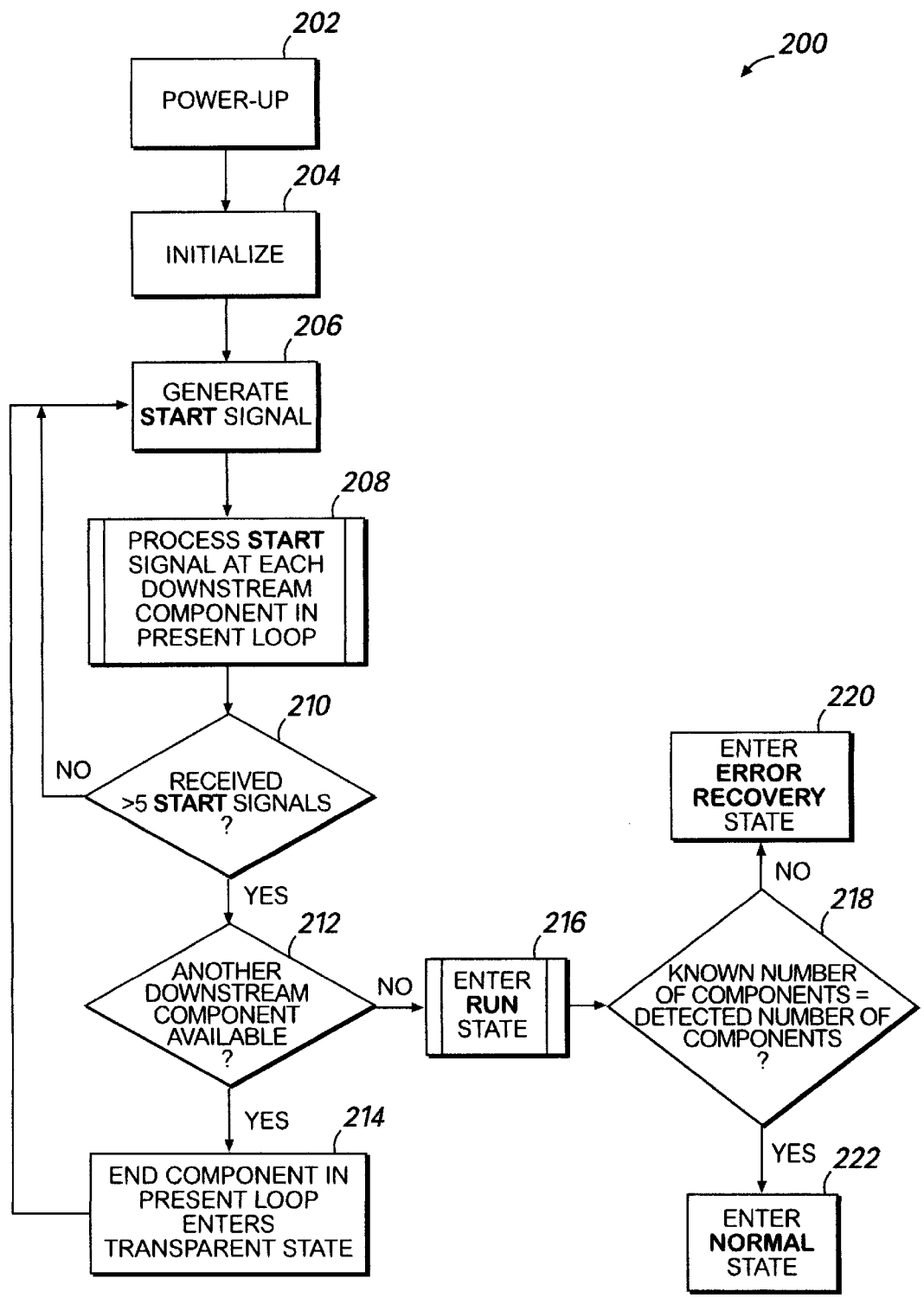
FIG. 10 is a logical flow diagram illustrating the steps of a method for transitioning a digital carrier system from a non-powered state to an operational state in accordance with an exemplary embodiment of the present invention.

FIGS. 10, 11, and 12 are logical flow diagrams illustrating aspects of the start-up procedure conducted by the digital carrier system 40 as it transitions from a non-operational state to an operational state. Referring first to FIG. 10, a start-up method 200 is initiated in step 202 in response to powering-up the individual components downstream of the COT, typically remote drop terminals and a remote terminal. In step 204, these downstream components are initialized in an adaptive training mode during step 204. The training mode configures each component for loop-back communication in the upstream direction of the digital carrier system 40. This training mode is typically initiated by the upstream transceiver for each communications link between a pair of downstream components. The COT, however, initiates the training mode for the communications link between itself and the first downstream component, typically a remote drop unit. The training operation completed by a downstream component is conducted independent of the training operations completed by the remaining downstream components. Consequently, the training of any particular downstream component may be completed prior to the training operations of the remaining downstream components.

In step 206, the COT generates a START signal, which is preferably sent continuously. The START signal comprises framed data having a valid 13-bit EOC. The five most significant bits of the EOC are set to a logical value of 1, and the remaining bits comprise the value 7E (hex). In other words, the START signal is represented by the logical value of 0 0001 0111 1110. Bits 8–11 of the START signal represent the unit address field. Each RDT 33, remote drop unit 34 and repeater 37 can have an address based on its position in the chain relative to the COT. For example, the unit adjacent to the COT will be assigned address 1 in the course of linking up.

In step 208, the START signal is processed by each downstream component that is active within the present loop. The framer can capture the START signal and, in response, the microprocessor determines whether the framer is synchronized with the data stream. If so, the microprocessor transfers the START signal to the upstream transceiver.

For example, in response to the COT generating the first START signal, the first downstream component on the bidirectional communications link will receive this START signal. Because this downstream component is initially set to the upstream loop-back mode, the component responds to the START signal by forwarding this signal stream direction to the COT. The remaining components on the bidirectional communications link will not receive this START signal because the first component forwards the START signal in the upstream direction rather than downstream to the remaining components. In other words, a component operating in the upstream loop-back mode operates to return or "echo" a received signal in the upstream direction rather than repeating or passing the received signal in the downstream direction.

Referring now to FIG. 11, the steps conducted during the processing task 208 are reviewed in detail. In step 230, a START signal is received by the downstream component. An inquiry is conducted in step 232 to determine whether the downstream component is operating in the transparent mode. In the transparent mode, the downstream component can accept a signal and, in response, forward that signal in the downstream direction. In the event that the inquiry in step 232 is negative, the "NO" branch is followed from step 232 to step 234. In step 234, the START signal is forwarded in the upstream direction. In other words, the processed signal is "echoed" by the downstream component rather than passing this signal downstream for reception by the next downstream component.

In the event that the response to the inquiry in step 232 is positive, the "YES" branch is followed to step 236. In step 236, the downstream component, operating in the transparent mode, processes the START signal by incrementing this signal's address field by a count of 1. In step 238, the downstream component passes the processed signal to the next component in the downstream loop. In turn, the process beings anew by returning to step 232.

Returning again to FIG. 10, in step 210, an inquiry is conducted to whether the final downstream component in the present loop has received more than five consecutive START signals. If not, the "NO" branch is followed from step 210 to step 206. Otherwise, the "YES" branch is followed from step 210 to step 212.

In step 212, an inquiry is conducted at the COT to determine whether each component on the bidirectional communications link has been detected or if a time-out period for component detection has been exceeded. The COT is preferably programmed with the number of downstream components for a particular installation. The COT can determine whether it has detected all downstream components by comparing the predetermined number of components to the value of the echoed START signal. The value of the echoed START signal will equal the number of downstream components within the present loop. In other words, the value of this signal will equal the physical sequence for the downstream components within the present loop. If this comparison results in a match in step 212, the COT will recognize that the present loop includes the final component in the downstream path, i.e., an end terminal, and the "YES" branch is followed from step 212 to step 216. Otherwise, the "NO" branch is followed from step 212 to step 214.

Alternatively, if the time since the most recent downstream unit has entered the transparent mode in step 214 exceeds a maximum programmable interval, the branch from step 212 to step 216 is taken. In step 214, the present "end" downstream component within the present loop enters the transparent mode in response to determining that training of the link between itself and the next downstream component is completed. To enter the transparent mode, this downstream component reconfigures its framer to an operational configuration. This allows the component to pass a received signal to the downstream path. Although this transition from the adapted training mode to the operational mode may cause a temporary loss of data sync, both the downstream component and COT are preferably programmed to tolerate transient frame synchronization loss during the start-up sequence. In the transparent mode, the microprocessor of the downstream component will accept the outbound START signal, increment the value of the START signal, and arrange for subsequent downstream transmission by the downstream transceiver. A branch is then followed from the step 214 to the step 206 to continue the start-up sequence for the next loop.

In the event that the COT determines that the chain of downstream components is complete, the COT will enter the RUN mode in step 216 by generating a RUN signal. The RUN signal is preferably set to a logical value of 1 0000 0111 1110. Upon entry to step 216, the value in the address field received by a unit such as the RDT 33, the remote drop unit 34, and the repeater 37 in the downstream direction just prior to the receipt of RUN signal becomes the permanent address of the unit. This address will subsequently be used in transfer of messages between the COT 38 and specific units.

A unit recognizing its address in the downstream address field will accept data from the COT in the lower byte (bits 0–7) of the EOC, and transfer data to the COT 38 by inserting the data in the lower byte of the upstream EOC. Other units, seeing an address (other than 0) in the downstream EOC other than their own will ignore the message and pass it on in the downstream direction. This processing task is based on the assumption that bit 13, the RUN bit, remains high.

FIG. 12 is a logical flow diagram illustrating the steps completed during the task 216. Turning now to FIG. 12, the task 216 begins in step 250 when the COT generates the RUN signal. In step 252, a downstream component responds to the RUN signal by determining whether its downstream link is ready. If so, the "YES" branch is followed from step 252 to step 254 and the downstream component determines that it is not the end terminal on the bidirectional communications link. In step 256, the downstream component increments by a count of 1 the RUN signal, which is received via the downstream link, and forwards this signal to the next upstream component. The process then returns to step 252.

In the event that the downstream component determines in step 252 that its downstream link is not ready, the "NO" branch is followed from step 252 to step 258. In step 258, the downstream component determines that it is the final downstream component of the bidirectional communications link. In step 260, the downstream component increments the value of the RUN signal and forwards this signal in the upstream direction.

In step 218, an inquiry is conducted to determine whether the digital carrier system can enter the normal mode of operation. The COT determines whether the detected number of downstream components is equal to the known number of downstream components connected to the bidirectional communications link. This inquiry is conducted by comparing the known number of downstream components to the value of the RUN signal received by the COT. In the event of a match, the COT determines that the system has entered the normal mode. Otherwise, the COT determines that the system has entered an error recovery state. If a match is not achieved, the "NO" branch is followed from step 218 to step 220 and an error recovery state is entered by the digital carrier system. Otherwise, the "YES" branch is followed from step 218 to step 222 and the normal state is entered by the digital carrier system.

Figure 13A:
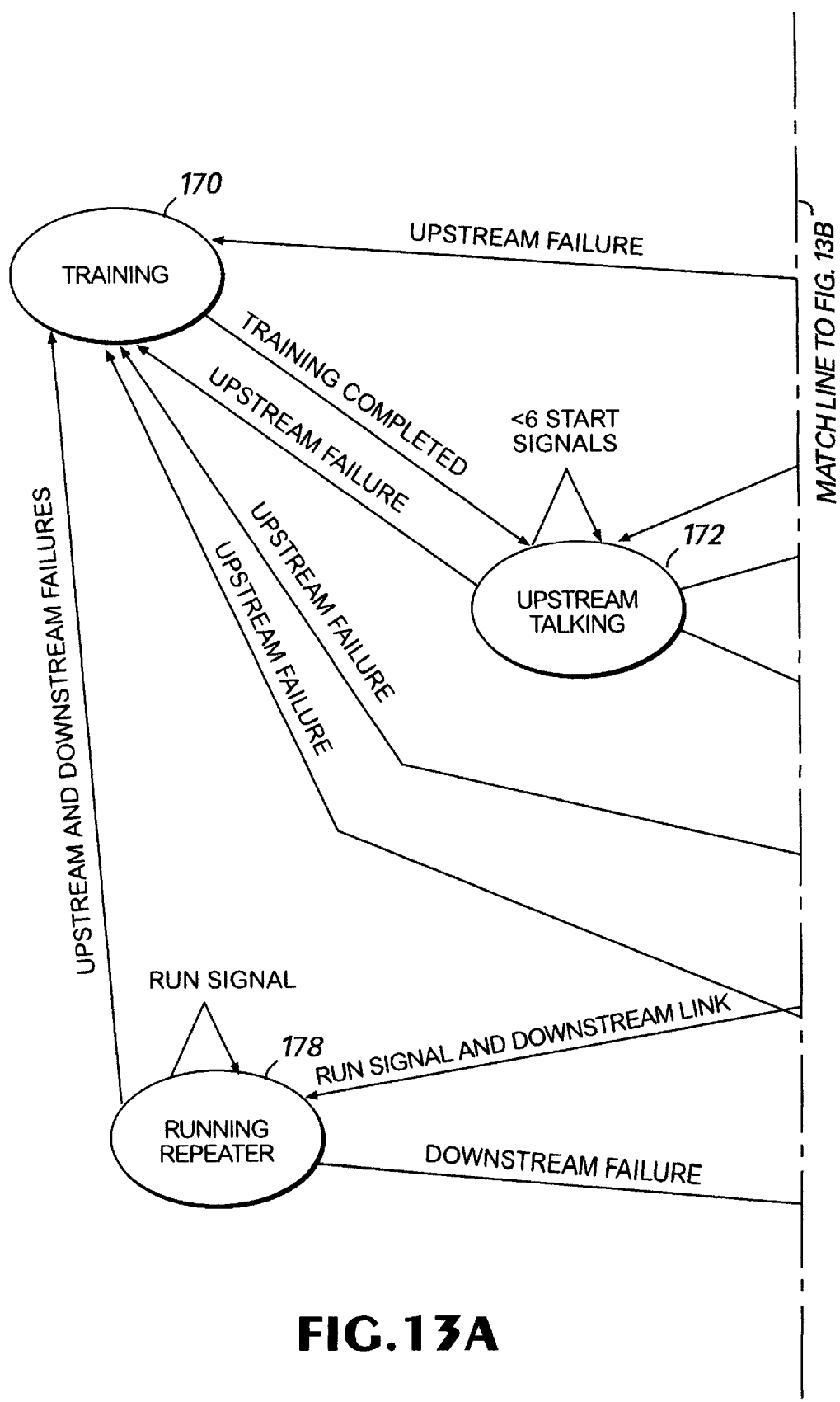
FIG. 13A and FIG. 13B are state diagrams illustrating the operating states of a digital carrier system in accordance with an exemplary embodiment of the present invention.
Figure 13B:
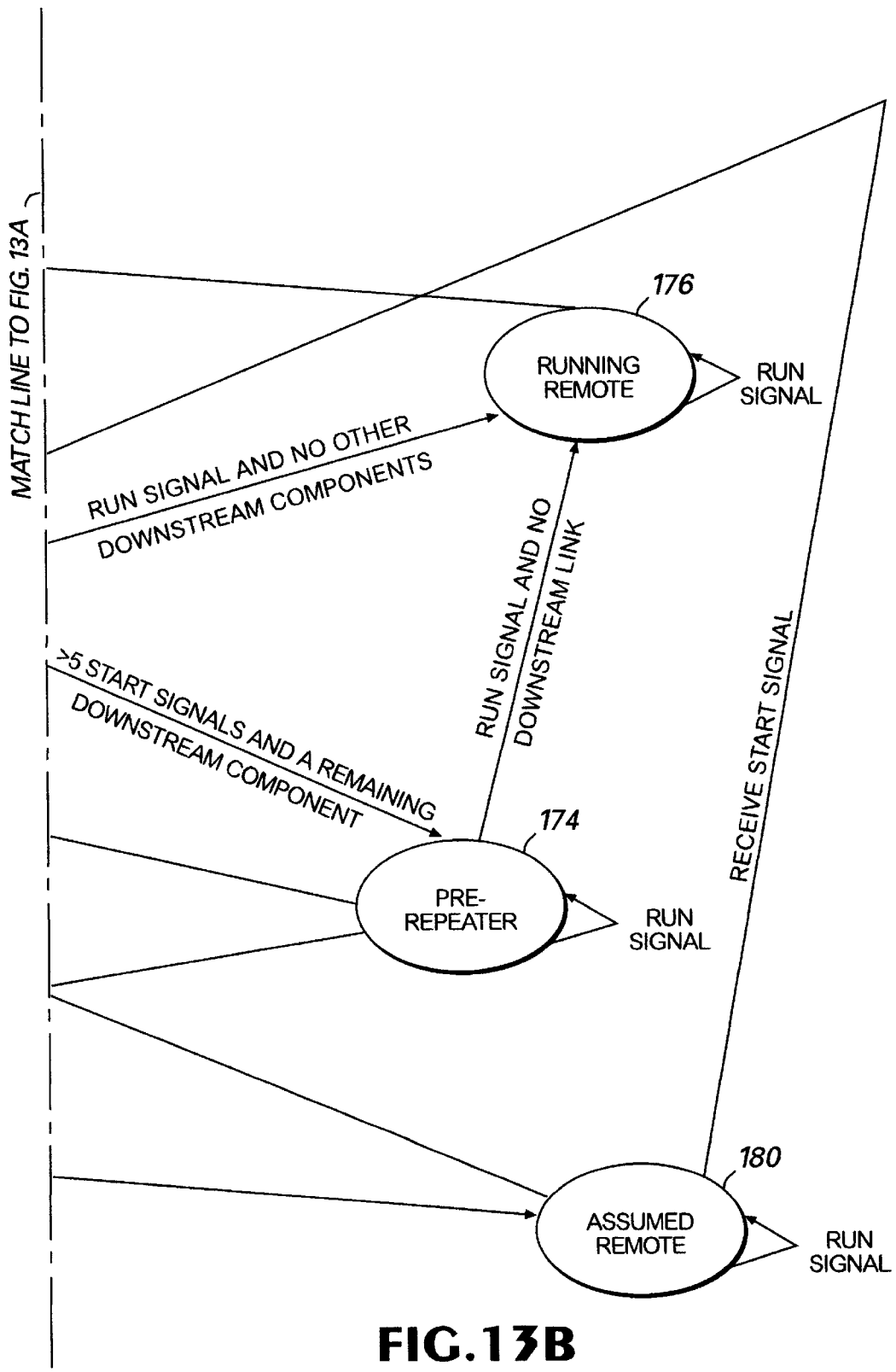

FIG. 13A and FIG. 13B, collectively described as FIG. 13, are state diagrams providing a more detailed overview of the operational states of the individual units of the digital carrier system 40. Turning now to FIGS. 5, 13A and 13B, the system begins operation in a Training state 170 in response to powering the system. In the Training state 170, each of the downstream components is initialized and training is conducted for each link connecting a pair of the downstream components. In response to determining that training for a link is a complete, the downstream components, such as the remote terminal units 33, the remote drop units 34, and the repeaters 37, transition from the state 170 to an Upstream Talking state 172.

In the Upstream Talking state 172, the COT generates the START signal for reception by component(s) of the present loop. The COT 38 will generate a continuous sequence of the START signals. In response to determining that another downstream link has been trained and more than five consecutive START signals have been received, the downstream component will transition from the Upstream Talking state 172 to a Pre-repeater state 174. The system will transition from the Upstream Talking state 172 to the Training state 170 in response to detection of an upstream link failure.

In the Pre-repeater state 174, the component in the downstream loop will enter the transparent mode to allow it to pass any received signals rather than to echo received signals to the upstream path. In particular, the downstream component operating in the transparent mode can increment the START signal and forward this incremented signal in the downstream direction to the next component.

In the event that the COT has generated a RUN signal in response to the detection of all downstream components by the COT, then the downstream component transitions from the state 172 to a Running Remote state 176. The state 176 is the preferred operating state for the end or final terminal on the bidirectional communications link, i.e., the termination component. In the state 176, this final component of the downstream communications path continues to operate in the upstream loopback mode rather than transitioning to the transparent mode. In this manner, this end terminal can transmit any signal received on the downstream path to the COT via the upstream path. In other words, the last component in the downstream path operates to echo a received signal by returning it in the upstream direction.

A transition from the Pre-repeater state 174 to the Running Remote state 176 occurs in response to the downstream component receiving a RUN signal and determining that a downstream link is not available. In other words, this downstream component is the end terminal for the bi-directional communications link, otherwise described as the termination component. The system can transition from either the Pre-repeater state 174 or the Running Remote state 176 to the Training state 170 in response to a detected failure in the upstream link.

The system can transition from the Pre-repeater state 174 to a Running Repeater state 178 in response to the RUN signal emitted by the COT when downstream components remain available for detection. In this operating state, EOC maintenance communications can take place between the downstream component and COT. RUN signals are processed by the downstream component in response to transmission of the signals by the COT.

In response to a detected failure in both the upstream and downstream links, the system can transition from the Running Repeater state 178 to the Training state 170. In contrast, if the system detects a failure in the downstream link, then the system can transition from the Running Repeater state 178 to an Assumed Remote state 180. In the Assumed Remote state 180, the repeater enters a loopback similar to a remote terminal. It continues to support maintenance communications and reception of the RUN signal from the COT. In the event that a failure in the upstream link is detected, the system can transition from the Assumed Remote state 180 to the Training state 170. Furthermore, the state 180 transitions to the state 172 in response to a START signal from the COT, thereby resulting in maintenance communications to attempt re-establishment of downstream link.

Figure 14:
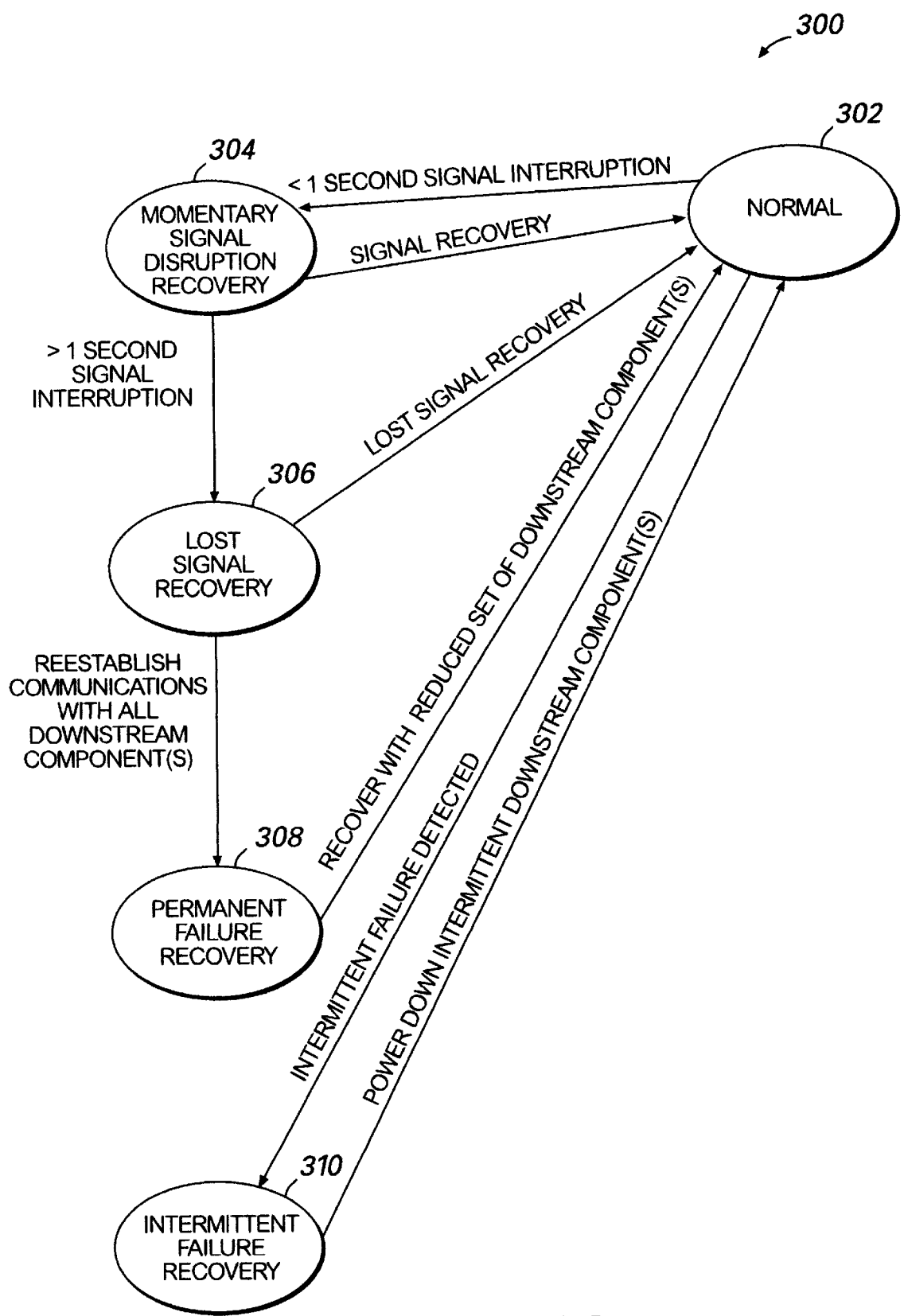
FIG. 14 is a state diagram illustrating the error recovery states of a digital carrier system in accordance with an exemplary embodiment of the present invention.

FIG. 14 is a state diagram illustrating a sequence of error recovery states for an exemplary digital carrier system. Turning now to FIGS. 5 and 14, an error recovery process 300 starts in a NORMAL state 302. The digital carrier system 40 conducts normal communication operations in the NORMAL state 302. In the event that a momentary disruption of communication data arises, the system will transition from the NORMAL state 302 to a Momentary Signal Disruption state 304. Specifically, in the event that frame synchronization or a signal carried on the upstream path is disrupted for approximately less than one second, the system will attempt to recover while operating in the Momentary Signal Disruption state 304.

In the event that the signal is recovered within an approximate one-second period, the system transitions from the Momentary Signal Disruption state 304 to the NORMAL state 302. Significantly, the system will not re-enter the start-up sequence shown in FIG. 9 as the result of a momentary signal disruption because the signal is recovered within the approximate one-step time period. The Momentary Signal Disruption state 304 represents a recover operation typically conducted in response to a transient event, such as a relatively distant lightning strike that causes a short term data disruption.

In the event that the system fails to recover after the passage of an approximate one second time period, the system will transfer from the Momentary Signal Disruption Recovery state 304 to a Loss Signal Recovery state 306. In the state 306, the COT typically can sense the absence of an echoed RUN signal and, consequently, attempt to reissue a START signal by initiating the start-up procedure in FIG. 9. In this manner, an attempt is made to re-establish a possible broken link by reintroducing the links between downstream components in response to the start-up sequence. In the event that communication with all downstream components is re-established, then the state 306 transitions to the NORMAL state 302.

On the other hand, the state 306 will transfer to the Permanent Failure Recovery state 308 if communication is not re-established for all downstream components. In the state 308, the COT determines that one or more downstream components failed to respond to the START signal issued during the start-up sequence of FIG. 9. Consequently, the COT will issue the RUN signal, which results in the last functional downstream component becoming the end terminal in the downstream communications path. In response to establishing a downstream communications path with a reduced set of components, the system will transition from the state 308 to the NORMAL state 302.

In the event that the system determines that a downstream component is operating on an intermittent basis, the system can transition from the NORMAL state 302 to an Intermittent Signal Recovery state 310. In the state 310, the COT can determine that the performance of a downstream component is intermittent and, consequently, should be power-down to preserve overall system performance. The COT can effectively drop this downstream component from the downstream communications path by causing this component to enter a "remote terminal" mode. For example, the COT can send less than five consecutive START signal to the component in-issue prior to transmitting the RUN signal. In the absence of five consecutive START signals, the component in-issue will not transition to the transparent mode. In other words, this downstream component will remain in the upstream loopback mode of operation. Upon shutting down this component, the system can transition from the intermittent signal recovery state 310 to the NORMAL state 302.

It will be appreciated that an advantage offered by the present DCS 40 is the capability of downloading software to components connected to the digital carrier line 35, including RDTs 33, remote drop units 34, and repeaters 37. This allows the modification or upgrading of component software, including firmware, by downloading the appropriate software program from the COT 38 to one or more selected components. This software download operation eliminates a need to remove a component and to ship it to a maintenance facility for replacement of the existing software program. To support this download operation, the RDTs 33, the remote drop units 34, and the repeaters 37 preferably include reprogrammable memory for storing software programs, such as firmware. Software intended for download delivery to components connected to the digital carrier line 35 can be inserted at the COT 38, specifically the RS-232 interface 90 or the RS-485 interface 94, for subsequent downloading to the connected components.

In view of the foregoing, it will be appreciated that the present invention provides a distributed digital carrier telephony system that supports the convenient and economical upgrade of telephony voice and data services for a location having a limited supply of copper wire pair installations for carrying a telephony signal. Significantly, the digital carrier telephony system can support the delivery of telephony signals as a multiplexed set of digitized subscriber channels carried via a single digital carrier signal line, typically an existing copper wire pair available at a wired telephone site. Remote drop units are connected to this digital carrier signal line for distributing a digital carrier signal between the central office and each subscriber's telephone. Each drop unit can be powered by electrical power originating at the Central Office and transported over the digital carrier signal line in the form of span power. A Central Office Terminal is connected to the Central Office and serves as a communication interface between the Central Office and remote drop units on the digital carrier signal line. The Central Office Terminal can insert the span power on the digital carrier signal line to power downstream components. Each remote drop unit can insert a subscriber channel into the multiplexed subscriber channels of an incoming digital carrier line signal transported via the digital carrier signal line. In addition, each remote drop unit can retrieve one of the subscriber channels from the multiplexed subscriber channels of an outgoing digital carrier line signal. A remote drop unit also can pass these incoming and outgoing carrier signals in the event that they are not intended for communication to a subscriber associated with that unit. However, these passed signals are typically amplified by the remote drop unit to increase signal levels, thereby eliminating a need to use bi-directional repeaters between any pair of remote drop units on the digital carrier signal line. A remote drop terminal can anchor the end of the digital carrier signal line opposite the combination of the Central Office terminal and the Central Office. The remote drop terminal provides functions identical to those of a remote drop unit and serves as the termination point for the digital carrier system.

It should be understood that the foregoing relates only to specific embodiments of the invention, and that numerous modifications may be made therein without departing from the spirit and scope of the invention as defined by the following claims.

What is claimed is:

1. A distributed digital carrier telephony system, comprising:
   a Central Office (CO) for processing telephony signals comprising subscriber channels;
   a CO Terminal (COT), connected between the CO and one end of a digital carrier line comprising only a single wire pair cable, for transmitting outgoing digital carrier line signals on the digital carrier line in response to multiplexing the subscriber channels of the telephony signals received from the CO, and for transmitting the telephony signals to the CO in response to demultiplexing subscriber channels of incoming digital carrier line signals received on the digital carrier line, both the outgoing digital carrier line signals and the incoming digital carrier line signals comprising multiplexed subscriber channels, the COT further operative to insert span power on the digital carrier line; and
   at least one remote drop unit, connected to the digital carrier line, for inserting one of the subscriber channels into the multiplexed subscriber channels of one of the incoming digital carrier line signals and for retrieving one of the subscriber channels from the multiplexed subscriber channels of one of the outgoing digital carrier line signals, each remote drop unit further operative to pass the incoming digital carrier line signals and the outgoing digital carrier line signals not intended for the corresponding remote drop unit, each remote drop unit powered by coupling the span power carried on the digital carrier line.

2. The system of claim 1 further comprising a remote drop terminal, connected to the other end of the digital carrier line, for inserting one of the subscriber channels into the multiplexed subscriber channels of one of the incoming digital carrier line signals and for retrieving one of the subscriber channels from the multiplexed subscriber channels of one of the outgoing digital carrier line signals, the remote drop terminal powered by coupling the span power carried on the digital carrier line and serving as the termination of the other end of the digital carrier system.

3. The system of claim 1, wherein each incoming and outgoing digital carrier line signal comprises a serial digital data stream comprising a plurality of time-division multiplexed, pulse code modulated subscriber channels capable of carrying voice and data signals and an overhead control channel comprising control messages.

4. The system of claim 3, wherein the overhead control channel further comprises framing data and timing information.

5. The system of claim 4, wherein the framing data comprises a framing structure defined by an HDSL structure comprising synchronization data, a plurality of payload segments, and a plurality of overhead items.

6. The system of claim 5, wherein each payload segment comprises a plurality of traffic data frames, each traffic data frame comprising framing data and a plurality of the subscriber channels.

7. The system of claim 6, wherein the framing data comprises a framing pattern, cyclic redundancy correction (CRC) data, and a Frame Data Link (FDL).

8. The system of claim 7, wherein each overhead control channel comprises a plurality of indicators bits, a plurality of address/control bits, data, and overhead channel CRC data.

9. The system of claim 1, wherein the incoming and the outgoing digital carrier signals are encoded with a modulated line code.

10. The system of claim 1, wherein the COT generates timing information for distribution by the outgoing digital carrier signals to clock each remote drop unit.

11. The system of claim 1, wherein the digital carrier line comprises only a single copper wire twisted pair cable.

12. The system of claim 1, wherein each remote drop unit comprises a plurality of subscriber interfaces terminated at particular subscriber locations.

13. The system of claim 1, wherein the COT can control the distribution of the span power to each remote drop unit by powering a subscriber interface of selected ones of the remote drop units and not powering a subscriber interface of the remaining non-selected ones of the remote drop units.

14. The system of claim 1, wherein each remote drop unit comprises a bidirectional repeater to boost the level of the incoming digital carrier line signals and the outgoing digital carrier line signals on the digital carrier line, thereby eliminating a need for placing stand-alone bidirectional repeaters on the digital carrier line between any pair of the remote drop units.

15. The system of claim 1, wherein each remote drop unit comprises:
an upstream line interface, connected to an upstream path of the digital carrier line, for processing the outgoing digital carrier line signal received on the upstream path, the upstream line interface operative to output the outgoing digital carrier line signal and the span power;
an upstream transceiver, connected to the upstream line interface, for generating a decoded outgoing digital carrier line signal in response to decoding the outgoing digital carrier line signal output by the upstream line interface;
a framer, connected to the upstream transceiver, for generating a processed outgoing digital carrier line signal in response to extracting overhead channel information from the decoded outgoing digital carrier line signal;
an add/drop unit, connected to the framer, for generating an extracted subscriber channel in response to demultiplexing the processed outgoing digital carrier line signal to extract one of the subscriber channels;
at least one subscriber interface, each connected to customer premises equipment (CPE) and to the add/drop unit, for forwarding the extracted subscriber channel to the corresponding CPE;
a downstream transceiver, connected to the framer, for generating an encoded outgoing digital carrier line signal in response to encoding the processed outgoing digital carrier line signal; and
a downstream line interface, connected to the downstream transceiver and to a downstream path of the digital carrier line, for combining the encoded outgoing digital carrier line signal and the span power for distribution in the downstream path; and
a controller for controlling operations conducted by the upstream transceiver, the downstream transceiver, the framer, the add/drop unit, and each subscriber interface.

16. The system of claim 15 wherein each remote drop unit further comprises a power supply for receiving the span power from the upstream line interface and converting the span power to local power for powering active components of the remote drop unit.

17. The system of claim 16, wherein the remote drop unit further comprises a power feed link connected to the upstream line interface and to the downstream line interface, the power feed link coupling the span power from the upstream line interface to the downstream line interface for distribution to the downstream path of the digital carrier line.

18. The system of claim 15, wherein:
each subscriber interface is further operative to forward one of the subscriber channels from the corresponding CPE;
the add/drop unit is further operative to generate an inserted subscriber channel signal in response to multiplexing an incoming carrier signal to insert one of the subscriber channels;
the framer is further operative to generate a processed incoming digital carrier line signal in response to inserting overhead channel information into the inserted subscriber channel signal;
the upstream transceiver is further operative to generate an encoded incoming digital carrier line signal in response to encoding the processed incoming digital carrier line signal; and
the upstream line interface is further operative to transmit the incoming digital carrier line signal on the upstream path in response to processing the encoded incoming digital carrier line signal.

19. The system of claim 15, wherein
the downstream line interface is further operative to receive the incoming digital carrier line signal in the downstream path;
the downstream transceiver is further operative to generate a decoded incoming digital carrier line signal in response to decoding the incoming digital carrier line signal output by the downstream line interface;
the framer is further operative to generate a processed incoming digital carrier line signal in response to extracting overhead channel information from the decoded incoming digital carrier line signal;
the upstream transceiver is further operative for generating an encoded incoming carrier line signal in response to encoding the processed incoming digital carrier line signal; and
the upstream interface is further operative to transmit the incoming digital carrier line signal on the upstream path in response to processing the encoded incoming digital carrier line signal.

20. The system of claim 1, wherein the COT is connected to a local power source and generates the span power for distribution onto the digital carrier line by the COT.

21. The system of claim 20 further comprising a ground fault detector, connected to the line interface and to earth ground, for generating a fault detection signal for disconnecting the span power from the line interface in response to detecting a ground fault condition in the span power distributed over the digital carrier line.

22. The system of claim 21 further comprising an alarm system, connected to the ground fault detector, for generating an alarm in response to the ground fault detector detecting the ground fault condition.

23. The system of claim 1, further comprising a plurality of the remote drop units, each distributed at a selected position along the digital carrier line.

24. The system of claim 23, wherein placement of the remote drop units along the digital carrier line is random and non-uniform within the limits of attenuation of the incoming and outgoing digital carrier line signals.

25. The system of claim 1 further comprising a plurality of the remote drop units placed at a selected position along the digital carrier line.

26. The system of claim 1, wherein the incoming and outgoing digital carrier line signals comprise a serial digital data stream of multiplexed subscriber channels and an overhead control channel comprising control messages for coordinating operations of each remote drop unit.

27. The system of claim 26, wherein the control messages include commands for assigning a selected function to be performed by each remote drop unit.

28. The system of claim 27, wherein the overhead control channel comprises an embedded operations channel (EOC) including address, data and control information, and each remote drop unit is assigned a unique address to support an assignment of a selected function via the EOC to a particular remote drop unit based on its corresponding address.

* * * * *